(12) United States Patent
Ekbatani et al.

(10) Patent No.: US 10,469,146 B1
(45) Date of Patent: Nov. 5, 2019

(54) REDUCING HYPOTHESIS SEARCH FOR MULTI-PANEL PRECODER SELECTION

(71) Applicant: QUALCOMM Incorporated, San Diego, CA (US)

(72) Inventors: Siavash Ekbatani, San Diego, CA (US); Qiang Shen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/146,919

(22) Filed: Sep. 28, 2018

(51) Int. Cl.
  *H04B 7/04* (2017.01)
  *H04B 7/0456* (2017.01)
  *H04W 72/04* (2009.01)
  *H04B 7/06* (2006.01)

(52) U.S. Cl.
  CPC ........... *H04B 7/0486* (2013.01); *H04B 7/046* (2013.01); *H04B 7/0632* (2013.01); *H04W 72/0453* (2013.01)

(58) Field of Classification Search
  CPC .. H04B 7/0456; H04B 7/0663; H04B 7/0478; H04B 7/0632; H04B 7/06; H04B 7/0486; H04B 7/046; H04L 5/0023; H04L 25/03191; H04W 72/0453; H04W 72/044
  See application file for complete search history.

(56) References Cited

U.S. PATENT DOCUMENTS

| | | | |
|---|---|---|---|
| 9,698,881 B2 | 7/2017 | Nammi et al. | |
| 2017/0126298 A1* | 5/2017 | Einhaus | H04B 7/0626 |
| 2017/0264349 A1 | 9/2017 | Kant et al. | |
| 2017/0288751 A1 | 10/2017 | Faxer et al. | |
| 2017/0294946 A1 | 10/2017 | Wang et al. | |
| 2017/0331531 A1 | 11/2017 | Wu | |

\* cited by examiner

*Primary Examiner* — Rahel Guarino
(74) *Attorney, Agent, or Firm* — Holland & Hart LLP

(57) ABSTRACT

Methods, systems, and devices for wireless communications are described. One example includes calculating one or more first channel capacities for each precoder hypothesis of a first subset of precoder hypotheses and selecting a first precoder hypothesis of the first subset of precoder hypotheses using the calculated first channel capacities. The example also includes selecting a second subset of precoder hypotheses based on the first precoder hypothesis, calculating one or more second channel capacities for each precoder hypothesis of the second subset of precoder hypotheses, and selecting a second precoder hypothesis of the second subset of precoder hypotheses using the calculated second channel capacities. The example also includes selecting grouping co-phase factors based at least in part on the first precoder hypothesis or the second precoder hypothesis and transmitting a first precoding matrix indicator that indicates a first precoder index based on the one or more grouping co-phase factors.

30 Claims, 15 Drawing Sheets

US 10,469,146 B1

REDUCING HYPOTHESIS SEARCH FOR MULTI-PANEL PRECODER SELECTION

BACKGROUND

The present disclosure relates generally to wireless communications, and more specifically to reducing hypothesis searching for multi-panel precoder selection.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

In 5G wireless communications, a base station (e.g., a gNodeB or gNB) may be in communication with a UE. The UE may provide the gNB with a precoding matrix indicator (PMI) report that indicates estimated channel characteristics for a channel between the gNB and the UE. The PMI report defines one or more grouping co-phase factors that are based on precoder indexes the UE calculated for the channel estimate. The gNB can use the information in the PMI report to adjust transmission parameters for subsequent transmissions to the UE. However, some gNBs or UEs may have one or two dimensional multi-panel antenna arrays. Based on these antenna arrays as well as a rank and a configuration mode of the gNB, there may be a large number of precoder hypothesis to calculate for the channel estimate. Calculating channel capacities for so many precoder hypotheses can be very costly in time, processing speed, and power.

SUMMARY

The described techniques relate to improved methods, systems, devices, and apparatuses that support reducing the number of precoder hypotheses searched for precoder selection. Generally, the described techniques provide for reducing the number of calculations performed in a precoder selection without significantly sacrificing performance. A search space may be constructed with two or more levels that identifies a subset of precoder hypotheses to be searched for each level. Channel capacities for the subset of precoder hypotheses are calculated, and a precoder hypothesis with a greatest channel capacity is selected. A next level is searched based on the selected precoder hypothesis, and a second precoder hypothesis with a greatest channel capacity is selected. Co-phase factors for the selected precoder hypotheses may be determined and used to generate one or more PMI reports.

A method of wireless communications is described. The method may include calculating one or more first channel capacities for each precoder hypothesis of a first subset of precoder hypotheses. The method may also include selecting a first precoder hypothesis of the first subset of precoder hypotheses based on the calculated first channel capacities. The method may also include selecting a second subset of precoder hypotheses based at least in part on the first precoder hypothesis and calculating one or more second channel capacities for each precoder hypothesis of a second subset of precoder hypotheses. The method may include selecting a second precoder hypothesis of the second subset of precoder hypotheses based on the calculated second channel capacities and selecting one or more grouping co-phase factors based on the first precoder hypothesis or the second precoder hypothesis. The method may also include transmitting a first PMI report that indicates a first precoder index based on the one or more grouping co-phase factors.

An apparatus for wireless communications is described. The apparatus may include a processor, memory in electronic communication with the processor, and instructions stored in the memory. The instructions may be executable by the processor to cause the apparatus to calculate one or more first channel capacities for each precoder hypothesis of a first subset of precoder hypotheses and select a first precoder hypothesis of the first subset of precoder hypotheses based on the calculated first channel capacities. The instructions may also be executable by the processor to cause the apparatus to select a second subset of precoder hypotheses based at least in part on the first precoder hypothesis and calculate one or more second channel capacities for each precoder hypothesis of a second subset of precoder hypotheses. The instructions may also be executable by the processor to cause the apparatus to select a second precoder hypothesis of the second subset of precoder hypotheses based on the calculated second channel capacities and select one or more grouping co-phase factors based on the first precoder hypothesis or the second precoder hypothesis. The instructions may be executable by the processor to cause the apparatus to transmit a first PMI report that indicates a first precoder index based on the one or more grouping co-phase factors.

Another apparatus for wireless communications is described. The apparatus may include means for calculating one or more first channel capacities for each precoder hypothesis of a first subset of precoder hypotheses and selecting a first precoder hypothesis of the first subset of precoder hypotheses based on the calculated first channel capacities. The apparatus may also include means for selecting a second subset of precoder hypotheses based at least in part on the first precoder hypothesis and means for calculating one or more second channel capacities for each precoder hypothesis of a second subset of precoder hypotheses. The apparatus may include means for selecting a second precoder hypothesis of the second subset of precoder hypotheses based on the calculated second channel capacities and selecting one or more grouping co-phase factors based on the first precoder hypothesis or the second precoder hypothesis. The apparatus may include means for transmitting a first PMI report that indicates a first precoder index based on the one or more grouping co-phase factors.

A non-transitory computer-readable medium storing code for wireless communications is described. The code may include instructions executable by a processor to calculate one or more first channel capacities for each precoder hypothesis of a first subset of precoder hypotheses and select a first precoder hypothesis of the first subset of precoder hypotheses based on the calculated first channel capacities. The code may also include instructions executable by a processor to select a second subset of precoder hypotheses based at least in part on the first precoder hypothesis and calculate one or more second channel capacities for each precoder hypothesis of a second subset of precoder hypotheses. The code may include instructions executable by a processor to select a second precoder hypothesis of the second subset of precoder hypotheses based on the calculated second channel capacities and select one or more grouping co-phase factors based on the first precoder hypothesis or the second precoder hypothesis. The code may include instructions executable by a processor to transmit a first PMI report that indicates a first precoder index based on the one or more grouping co-phase factors.

In some examples of the method, apparatuses, and non-transitory computer-readable medium described herein, calculating the first channel capacities for each precoder hypothesis further may include operations, features, means, or instructions for calculating the first channel capacities for a subset of precoder hypotheses associated with each node of the first group of nodes.

Some examples of the method, apparatuses, and non-transitory computer-readable medium described herein may further include operations, features, means, or instructions for determining that the first precoder hypothesis may be associated with a first node of the first group of nodes and selecting precoder hypotheses from one or more nodes for the first group of nodes to include in the second subset of precoder hypotheses based on proximity of the one or more nodes to the first node.

Some examples of the method, apparatuses, and non-transitory computer-readable medium described herein may further include operations, features, means, or instructions for selecting one or more second grouping co-phase factors based on the second precoder hypothesis and transmitting a second PMI report that indicates a second precoder index based on the selected one or more second grouping co-phase factors.

In some examples of the method, apparatuses, and non-transitory computer-readable medium described herein, determining the first precoder hypothesis further may include operations, features, means, or instructions for determining a precoder hypothesis with a highest channel capacity and selecting the precoder hypothesis with the highest channel capacity as the first precoder hypothesis.

In some examples of the method, apparatuses, and non-transitory computer-readable medium described herein, selecting the one or more grouping co-phase factors further may include operations, features, means, or instructions for selecting one or more grouping co-phase factors for each channel rank.

Some examples of the method, apparatuses, and non-transitory computer-readable medium described herein may further include operations, features, means, or instructions for entering a short-term monitoring stage, during the short-term monitoring mode, selecting one of a right-side rule or a left-side rule and applying the selected right-side rule or the left-side rule for selecting at least one of the first subset of precoder hypotheses or the second subset of precoder hypotheses.

In some examples of the method, apparatuses, and non-transitory computer-readable medium described herein, selecting one of the right-side rule or the left-side rule during the short-term monitoring mode further may include operations, features, means, or instructions for determining the first subset of precoder hypotheses using one of the right-side rule or the left-side rule, wherein selecting the second subset of precoder hypotheses is further based on the other one of the right-side rule or the left-side rule, and determining a quantization metric between the first subset of precoder hypotheses and the second subset of precoder hypotheses and selecting the right-side rule or the left-side rule based on the quantization metric.

Some examples of the method, apparatuses, and non-transitory computer-readable medium described herein may further include operations, features, means, or instructions for entering a long-term operational stage using the selected right-side rule or left-side rule.

Some examples of the method, apparatuses, and non-transitory computer-readable medium described herein may further include operations, features, means, or instructions for constructing the first subset of precoder hypotheses using the selected right-side rule or the left-side rule, wherein selecting the second subset of precoder hypotheses is further based on the selected right-side rule or the left-side rule.

DETAILED DESCRIPTION

Figure 1:
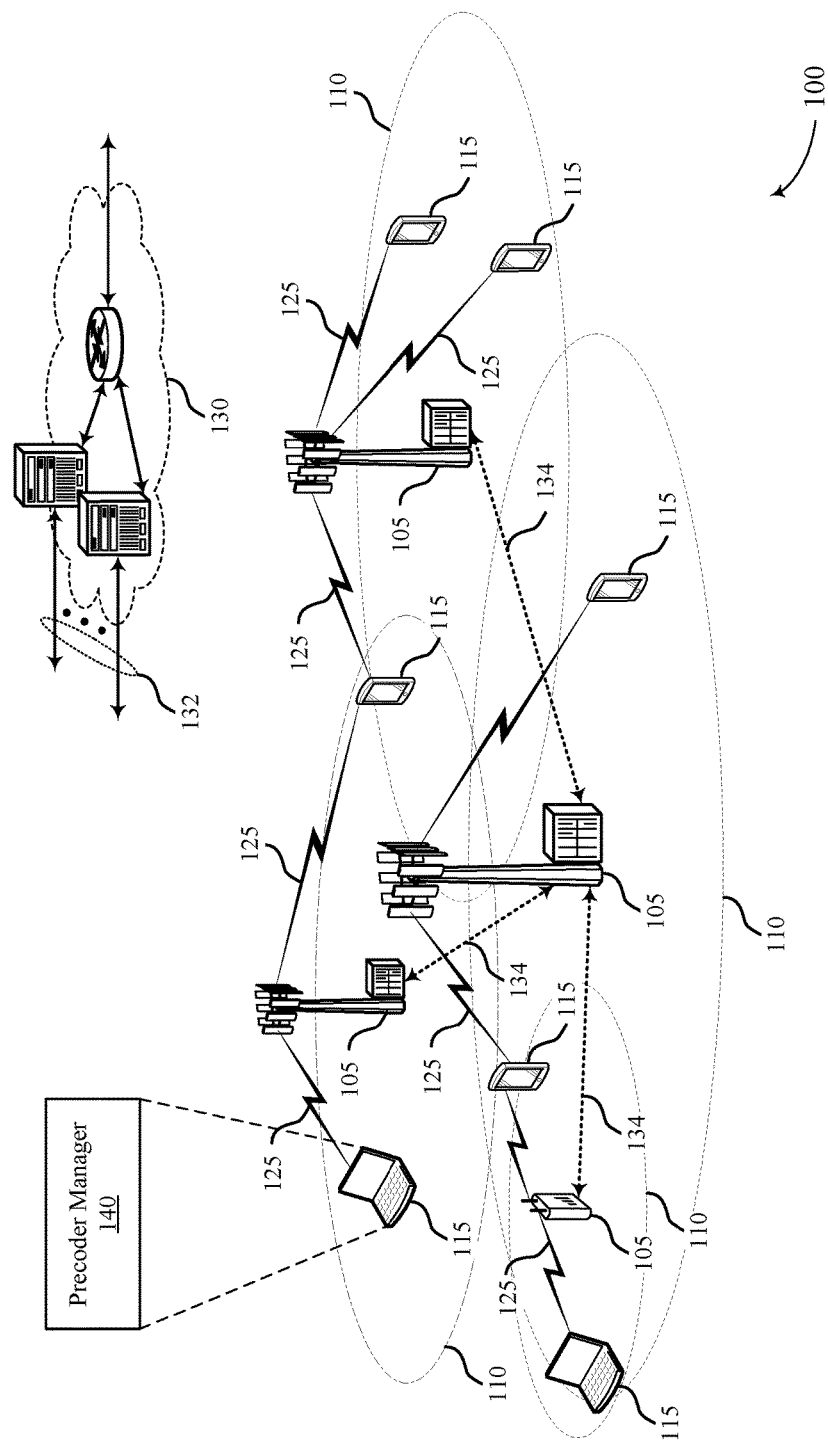
FIG. 1 illustrates an example of a system for wireless communications that supports reducing hypothesis search for multi-panel precoder selection in accordance with aspects of the present disclosure.

Techniques are proposed which reduce the complexity of calculating channel capacities for multi-panel precoder matrixes without sacrificing performance. Two wireless devices may communicate over a channel, which is a potentially changing medium over which the two devices communicate wirelessly. Precoder hypotheses may be searched to determine channel conditions. Information about the channel conditions can be used by the wireless devices to communicate more effectively. A search scheme is developed which reduces the number of precoder hypotheses to be searched to generate the information about the channel conditions. The search scheme may be applied in two or more steps.

For example, a subset of precoder hypotheses may be searched in two or more steps instead of a conventional method which calculates channel capacities for all of the precoder hypotheses. The first, coarser step searches a subset of the precoder hypotheses (for example, 16 of 128 precoder hypotheses) associated with nodes of a search tree. Only some of these nodes may be selected to have some of their associated precoder hypotheses searched. Nodes that are selected can be evenly spaced (e.g., the precoder hypotheses searched may have a similar phase as each other). The channel capacities for the selected subset of precoder hypotheses are calculated. The channel capacities for each of the searched precoder hypotheses are compared. A precoder hypothesis with the highest channel capacity may be selected as a winning precoder hypothesis. In the event of a tie, one of the precoder hypotheses with the highest channel capacity may be selected. The UE may or may not generate a PMI report which identifies one or more grouping co-phase factors based on the winning precoder hypothesis. If the UE does generate a PMI report at this time, it transmits the PMI report to the gNB.

Once the winning precoder hypothesis from the first step is determined, the UE may perform a second, finer search step. The second step searches a few more precoder hypothesis (e.g., 7 more precoder hypotheses of the 128) based at least in part on a node associated with the winning precoder hypothesis. A second winning precoder hypothesis may be determined from these additionally searched precoder hypotheses and the winning precoder hypothesis from the first step. A PMI report may be generated which identifies one or more grouping co-phase factors based on the second winning precoder hypothesis. In this example, a potential 128 calculations is reduced to 23 calculations. Other examples may use different subsets of nodes and precoder hypotheses, different spacing of the selected nodes, and the same or different phases of the nodes.

Aspects of the disclosure are initially described in the context of a wireless communications system. Examples of precoder search trees illustrate how the precoder search can be reduced while maintaining a sufficiently good channel estimate. A process flow diagram illustrates how a search space may be built. Aspects of the disclosure are further illustrated by and described with reference to apparatus diagrams, system diagrams, and flowcharts that relate to reducing hypothesis search for multi-panel precoder selection.

FIG. 1 illustrates an example of a wireless communications system 100 that supports reducing hypothesis search for multi-panel precoder selection in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may represent a device such as a wireless communication terminal, including a mobile station, a phone, a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, a personal computer, or display devices (e.g., TVs, computer monitors, etc.), printers, etc. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions.

The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115.

Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiple access (OFDM) or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

One or more of the UEs 115 may include a precoder manager 140, which may use a multi-mode calculation of spectral efficiency in order to estimate a channel between the UE 115 and a base station 105. The precoder manager 140 may determine a search space and use two or more steps to reduce a number of precoder hypotheses searched.

The precoder manager 140 may calculate one or more first channel capacities for each precoder hypothesis of a first subset of precoder hypotheses and select a first precoder hypothesis of the first subset of precoder hypotheses based at least in part on the calculated first channel capacities. The precoder manager 140 may select one or more grouping co-phase factors based at least in part on the first precoder hypothesis or the second precoder hypothesis. Using the one or more grouping co-phase factors, the precoder manager 140 may generate a precoding matrix indicator report for transmitting to the base station 105.

In some examples, the precoder manager 140 may also calculate one or more second channel capacities for each precoder hypothesis of a second subset of precoder hypotheses, wherein the second subset of precoder hypotheses are selected based at least in part on the first precoder hypothesis. The precoder manager 140 may select a second precoder hypothesis of the second subset of precoder hypotheses based at least in part on the calculated second channel capacities. The PMI report described may be generated also based on additional grouping co-phase factors based at least in part on the second precoder hypothesis. In other examples, a different PMI report may be generated based on the additional grouping co-phase factors.

In another example, one or more of the base stations 105 may contain a precoder manager similar to the precoder manager 140 that also performs channel estimation according to the techniques described herein. The precoder manager 140 performs a search of the precoder space in two or more steps, which reduces the amount of overall computation required for estimating a channel.

Figure 2:
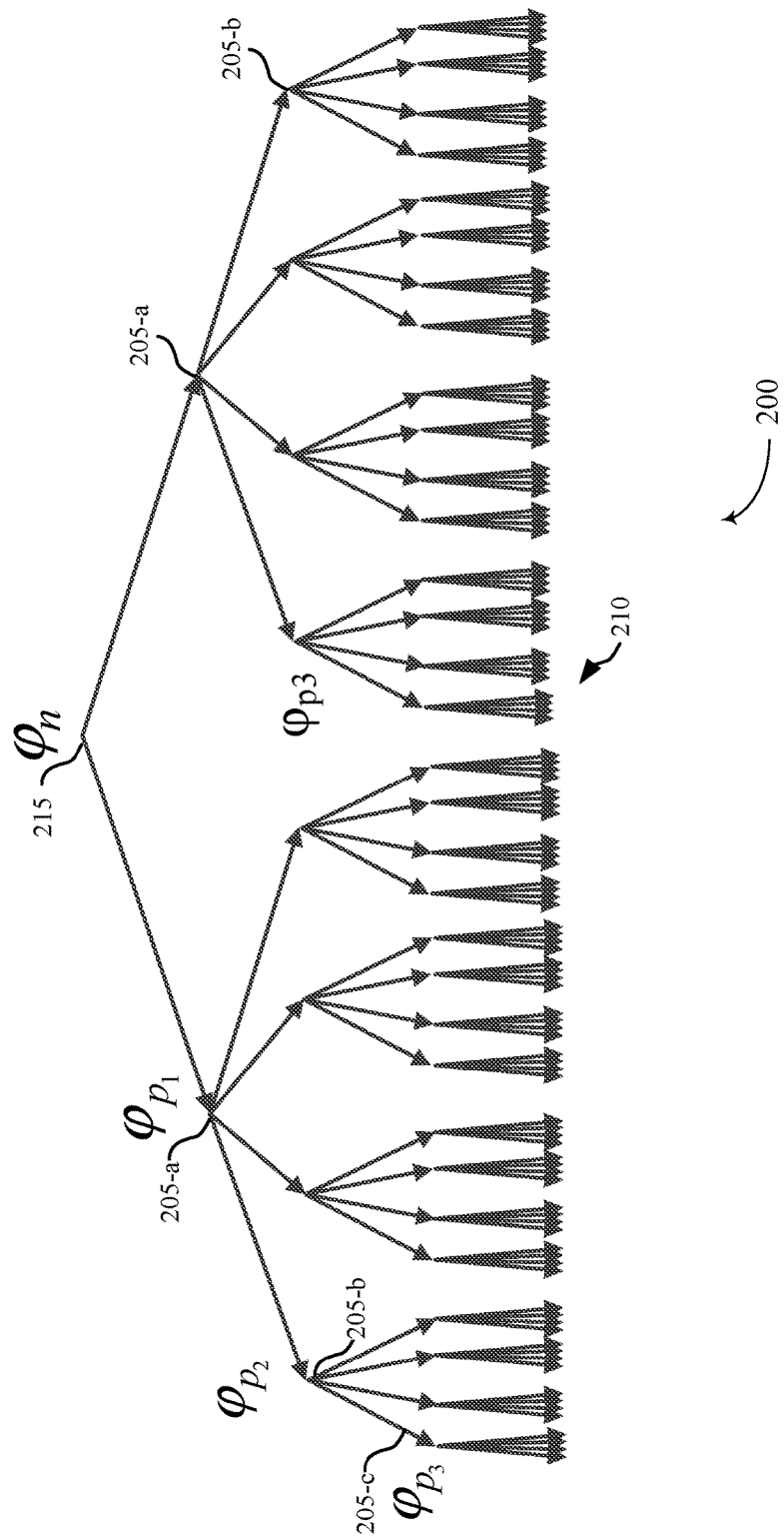
FIGS. 2 through 5 illustrate examples of a precoder search tree that can be used for reducing the search required for precoder selection in accordance with aspects of the present disclosure.

FIG. 2 illustrates an example of a conceptual diagram of a precoder search tree 200 that can be used for reducing the search required for precoder selection in accordance with aspects of the present disclosure. In some examples, the precoder search tree 200 may be implemented within aspects of the wireless communications system 100.

For each communication channel, a UE estimates the values for the co-phase factors between the panels of the transmit antenna array. For multi-panel precoders, such as one- or two-dimensional antenna arrays, a grouping pattern may be able to reduce the complexity of the co-phase calculation. A grouping pattern may be used to divide the precoder search space into groups of matrices having isotropic properties within each group. Breaking the precoder search space in such a way may reduce the computation complexity of the channel capacity across different hypotheses. However, for some precoders this is not an option. Grouping patterns may be used with only some general precoders structures. It is not possible to apply grouping patterns to type 1 multi-panel precoders, for example.

If there are no grouping patterns that can be applied, then the search space may be quite large. The number of precoder hypotheses that can be searched may depend at least on a precoder mode, the size of the antenna array, a rank, or other factors. The communication standard or protocol used may define a number of precoder modes, which influences the number of precoder hypotheses. For example, 5G NR defines several precoder modes. Some precoder modes have many precoder hypotheses while others have fewer. There are also different numbers of precoder hypotheses for different ranks. The UE may need an estimate for each co-phase factor for all the ranks. For example, multi-panel precoders (e.g., type I, mode 1 with 4 panels, and mode 2) may have many hypotheses.

An example search space is described below for illustrative purposes. In some examples of a multi-panel precoder, the search space for mode 1 with $N_g=4$ and mode 2 will amount to 256, 128, 128, and 128 precoder hypotheses for ranks 1, 2, 3, and 4, respectively. Table 1 provides an example codebook with which a UE may be configured that can be used for this multi-panel example. The example of Table 1 specifically provides a codebook for 4-layer channel state information reporting using antenna ports (e.g., 3000 to 2999+$P_{CSI-RS}$). $P_{CSI-RS}$ denotes the number of CSI-RS ports. The formulas provided in Equation 1 provide an example precoder structure, with the nodes, $\varphi_n$, defined in Equation 2.

TABLE 1

CodebookMode = '1', Ng ∈ {2,4}

| $i_{1,1}$ | $i_{1,2}$ | $i_{1,4,q} = 1, \ldots, N_g - 1$ | $i_2$ | |
|---|---|---|---|---|
| $0, \ldots, N_1O_1 - 10$ | $\ldots, N_2O_2 - 1$ | $0,1,2,3$ | $0,1$ | $W_{i_{1,1}, i_{1,1}+k_1, i_{1,2}, i_{1,2}+k_2, i_{1,4}, i_2}^{(4)}$ | where
$$W^{(4)}_{l,l',m,m',p,n} = \frac{1}{\sqrt{4}} \left[ W^{1,N_g,1}_{l,m,p,n} \quad W^{1,N_g,1}_{l',m',p,n} \quad W^{2,N_g,1}_{l,m,p,n} \quad W^{2,N_g,1}_{l',m',p,n} \right]$$

and the mapping from $i_{1,3}$ to $k_1$ and $k_2$ is given.

$$W^{1,4,1}_{l,m,p,n} = \frac{1}{\sqrt{P_{CSI-RS}}} \begin{bmatrix} v_{l,m} \\ \varphi_n v_{l,m} \\ \varphi_{p_1} v_{l,m} \\ \varphi_n \varphi_{p_1} v_{l,m} \\ \varphi_{p_3} v_{l,m} \\ \varphi_n \varphi_{p_3} v_{l,m} \\ \varphi_{p_3} v_{l,m} \\ \varphi_n \varphi_{p_3} v_{l,m} \end{bmatrix} \quad (1)$$

$$W^{2,4,1}_{l,m,p,n} = \frac{1}{\sqrt{P_{CSI-RS}}} \begin{bmatrix} v_{l,m} \\ -\varphi_n v_{l,m} \\ \varphi_{p_1} v_{l,m} \\ -\varphi_n \varphi_{p_1} v_{l,m} \\ \varphi_{p_2} v_{l,m} \\ -\varphi_n \varphi_{p_1} v_{l,m} \\ \varphi_{p_1} v_{l,m} \\ -\varphi_n \varphi_{p_3} v_{l,m} \end{bmatrix}$$

$$\varphi_n = e^{\frac{j\pi n}{2}} \quad (2)$$

For this example of a multi-panel precoder of rank 4, mode 1, and $N_g = 4$, 128 precoder hypotheses 210 are available. This large search space may require applying an algorithm (e.g., Cholesky factorization or the like) 128 times per resource block. FIG. 2 illustrates these 128 precoder hypotheses 210. With pipelining, applying this search scheme for each precoder hypothesis can amount to large processing and die area requirements. Note, however, that this is merely one example of a search algorithm and codebook, and that many other examples may be used. For example, Table 2 provides another example codebook where the mode is 2 with an example precoder structure defined in Equations 3 through 5.

TABLE 2

CodebookMode = '2', $N_g = 2$

| $i_{1,1}$ | $i_{1,2}$ | $i_{1,4,q}$, q = 1, 2 | $i_{2,q}$, q = 0, 1, 2 | |
|---|---|---|---|---|
| $0, \ldots, N_1O_1 - 10$ | $\ldots, N_2O_2 - 1$ | $0,1,2,3$ | $0,1$ | $W_{i_{1,1}, i_{1,1}+k_1, i_{1,2}, i_{1,2}+k_2, i_{1,4}, i_2}^{(2)}$ | where
$$W^{(2)}_{l,l',m,m',p,n} = \frac{1}{\sqrt{2}} \left[ W^{1,N_g,2}_{l,m,p,n} \quad W^{2,N_g,2}_{l',m',p,n} \right]$$

and the mapping from $i_{1,3}$ to $k_1$ and $k_2$ is given.

$$W^{1,2,2}_{l,m,p,n} = \frac{1}{\sqrt{P_{CSI-RS}}} \begin{bmatrix} v_{l,m} \\ \varphi_{n_0} v_{l,m} \\ a_{p_1} b_{n_1} v_{l,m} \\ a_{p_2} b_{n_2} v_{l,m} \end{bmatrix} \quad (3)$$

-continued $$W^{2,2,2}_{l,m,p,n} = \frac{1}{\sqrt{P_{CSI-RS}}} \begin{bmatrix} v_{l,m} \\ -\varphi_{n_0} v_{l,m} \\ a_{p_1} b_{n_1} v_{l,m} \\ -a_{p_2} b_{n_2} v_{l,m} \end{bmatrix}$$

$$a_p = e^{\frac{j\pi}{4}} e^{\frac{j\pi p}{2}} \quad (4)$$

$$b_n = e^{\frac{-j\pi}{4}} e^{\frac{j\pi n}{2}} \quad (5)$$

In order for the UE to examine each precoder hypothesis, the UE may perform many calculations for each precoder hypothesis. For example, the UE finds an equivalent capacity for each channel for each of the inter-panel co-phase factors. Calculating all of these channel capacities is very computationally expensive. This requires a larger hardware area, a longer timeline, and more power. Instead of computing all of these channel capacities, techniques described herein reduce the precoder hypothesis search while maintaining good performance.

These techniques can be applied to different types of channels that exist in the 5G environment. Usually the channels have different time domains, spatial domains, and correlation properties. The precoders are designed such that if they are exhaustively searched, the UE can find a very good estimate which the gNB can use to direct a beam very close to the UE. Techniques described herein reduce the computational complexity without significantly reducing performance across different channel models. Performance may be defined as a final achieved throughput or a range of access for the UE.

In the example of FIG. 2, the precoder search tree 200 includes 128 precoder hypotheses 210. The precoder search tree 200 includes three different categories of co-phase factors $\varphi_{p1}$, $\varphi_{p2}$, $\varphi_{p3}$, denoted 205-a, 205-b, and 205-c, respectively. The categories of co-phase factors 205 may also be referred to herein as search nodes 205 or merely nodes 205. The search nodes translate to leaves of the precoder search tree 200. Each precoder hypothesis 210 corresponds to a path from a main tree node 215 to the leaf.

If these precoder hypotheses 210 are searched exhaustively, all the branches of the tree for each node 205 are searched. This would result in the channel capacity calculation being performed 128 times. As seen from Equation 1, $v_{i,m}$ is common between all of the inter-panel co-phase factors. In some examples, no reduction is made to the calculation of $v_{I,m}$. However, reduction can be performed on the nodes 205 ($\varphi_{p1}$, $\varphi_{p2}$, $\varphi_{p3}$).

Each category of co-phase factors 205 has some possible precoder hypotheses that can be disjointly searched. However, disjointly searching the nodes 205 may result in lost performance due to lost degrees of freedom. Therefore, the techniques described herein use the nodes 205 together in such a way as to incorporate most or all of the search nodes 205. While not searching every node 205, the techniques described herein break the search into two or more steps and reduce the number of calculations.

Figure 3:
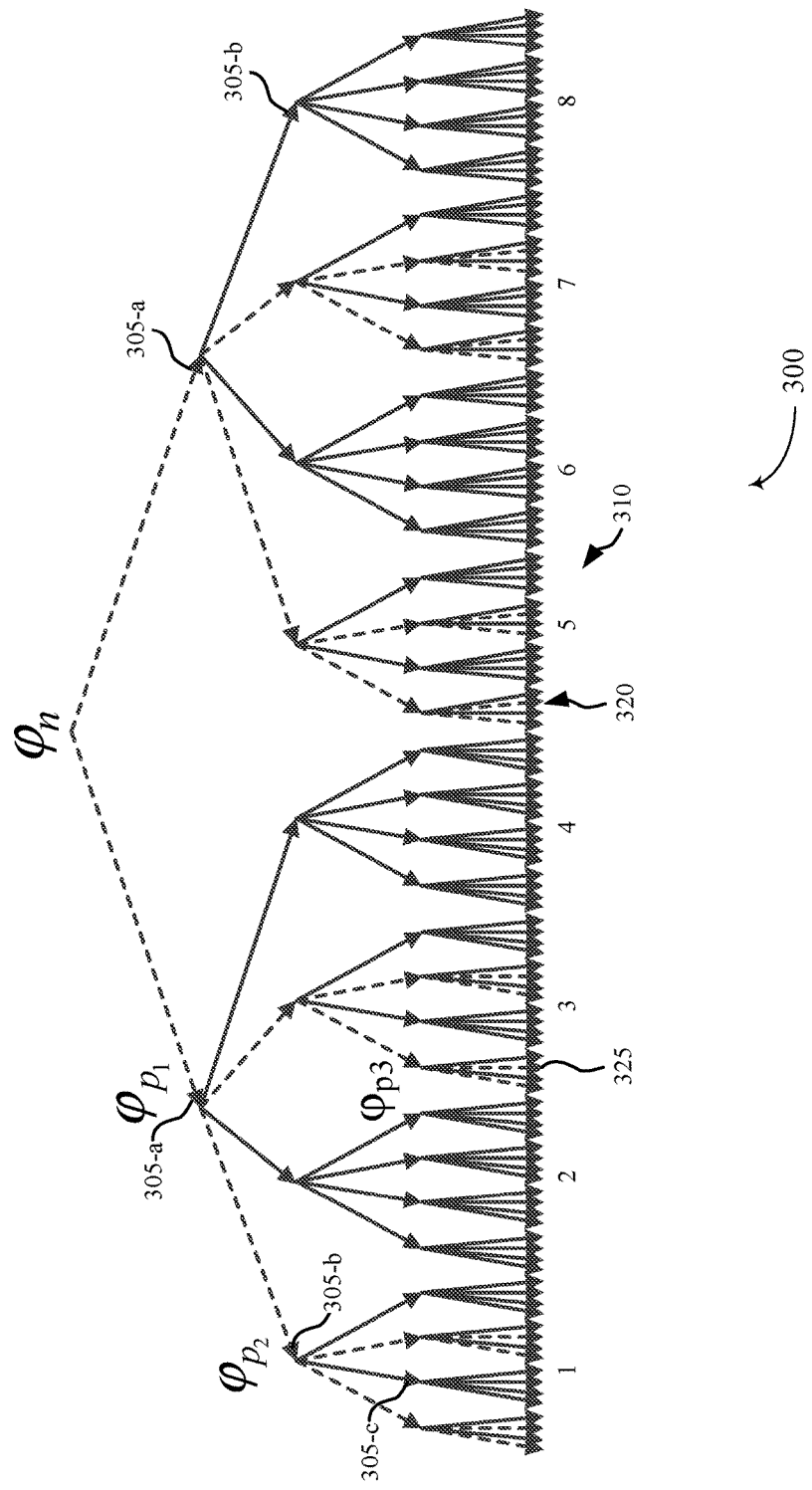

FIG. 3 illustrates an example of a conceptual diagram of a precoder search tree 300 that can be used for reducing the search required for precoder selection in accordance with aspects of the present disclosure. In some examples, precoder search tree 300 may be implemented within aspects of the wireless communications system 100. Like the precoder search tree 200, the precoder search tree 300 has 128 precoder hypotheses. The precoder search tree 300 has eight branches labeled 1 through 8. The precoder search tree 300 includes three different categories of nodes $\varphi_{p1}$, $\varphi_{p2}$, $\varphi_{p3}$, denoted 305-a, 305-b, and 305-c, respectively.

FIG. 3 shows a first step where a subset of the precoder hypotheses 320 are searched. A UE may calculate channel capacities for a subset of precoder hypotheses 320 associated with each node of a first group of nodes. In this example, 16 precoder hypotheses 320 are searched, indicated by the dashed lines. That is, channel capacities are calculated for only 16 precoder hypotheses 320. Four precoder hypotheses 320 each are searched in branches 1, 3, 5, and 7. In other examples, more or less than 16 precoder hypotheses 320 may be searched. However, the distance between the precoder hypotheses 320 that are searched may be uniform.

The UE determines which branch results in the highest channel capacity among all of those searched. That is, the UE compares the channel capacities of all the searched precoder hypotheses 320 and selects the precoder hypothesis 325 with the highest channel capacity. In the event of a tie, the UE may choose between the winning precoder hypotheses 320 based on its position within the precoder search tree 300, randomly, one closer to the center or edge of the precoder search tree 300, or the like. In this particular example of FIG. 3, the precoder hypothesis 325 had the highest channel capacity. This precoder hypothesis 325 is selected as a winning precoder hypothesis.

Figure 4:
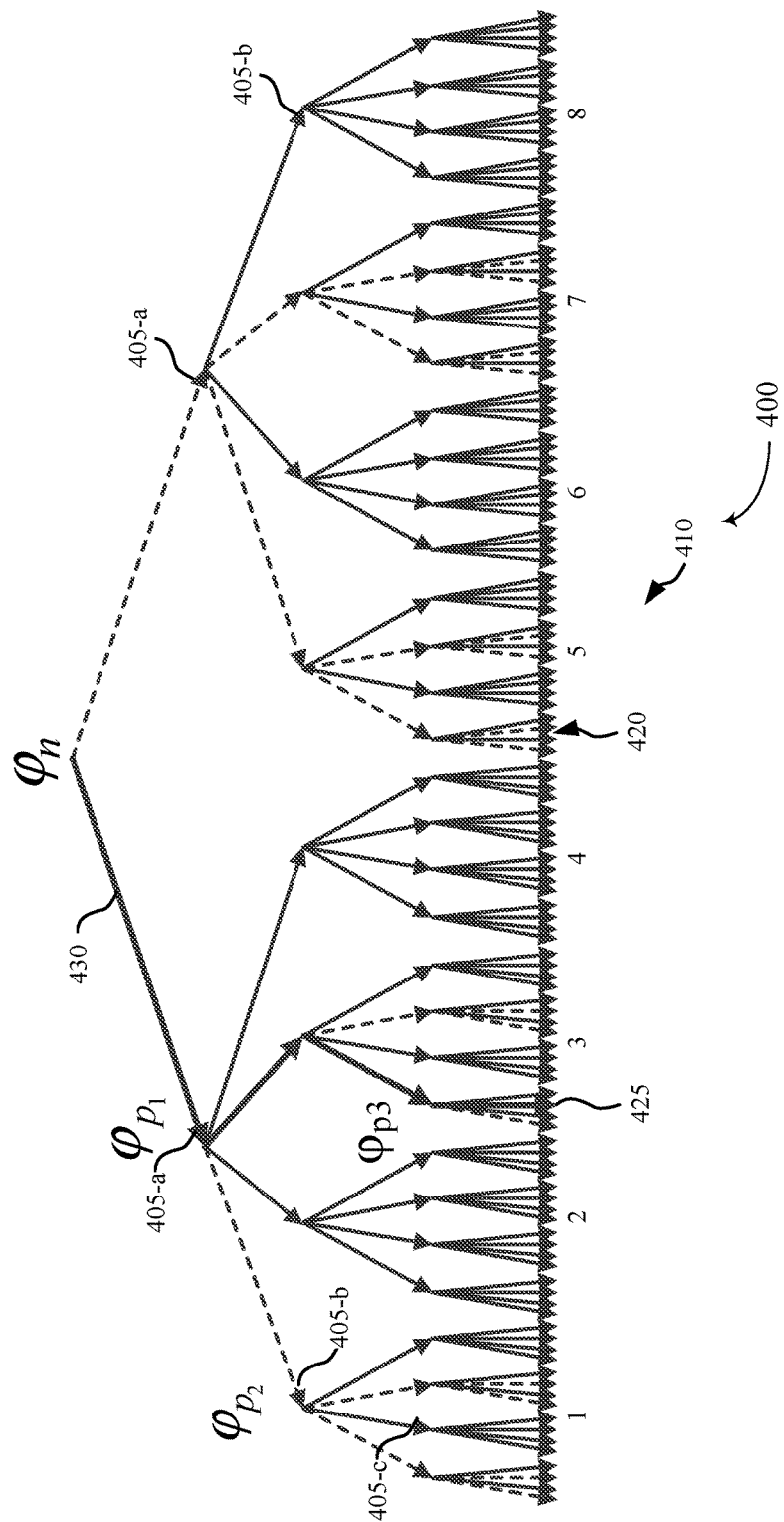

FIG. 4 illustrates an example of a precoder search tree 400 that can be used for reducing the search required for precoder selection in accordance with aspects of the present disclosure. In some examples, precoder search tree 400 may be implemented within aspects of the wireless communications system 100. Like the precoder search trees 200 and 300, the precoder search tree 400 has 128 precoder hypotheses. The precoder search tree 400 has eight branches labeled 1 through 8. The precoder search tree 400 illustrates a winning precoder hypothesis 425, which corresponds to the winning precoder hypothesis 325 of FIG. 3, and a path 430 through nodes 405-a, 405-b, and 405-c to get to the winning precoder hypothesis 425. The path 430 is illustrated by bold lines. In some examples, the UE may transmit a PMI report based at least in part on one or more co-phase factors associated with the winning precoder hypothesis 425.

Figure 5:
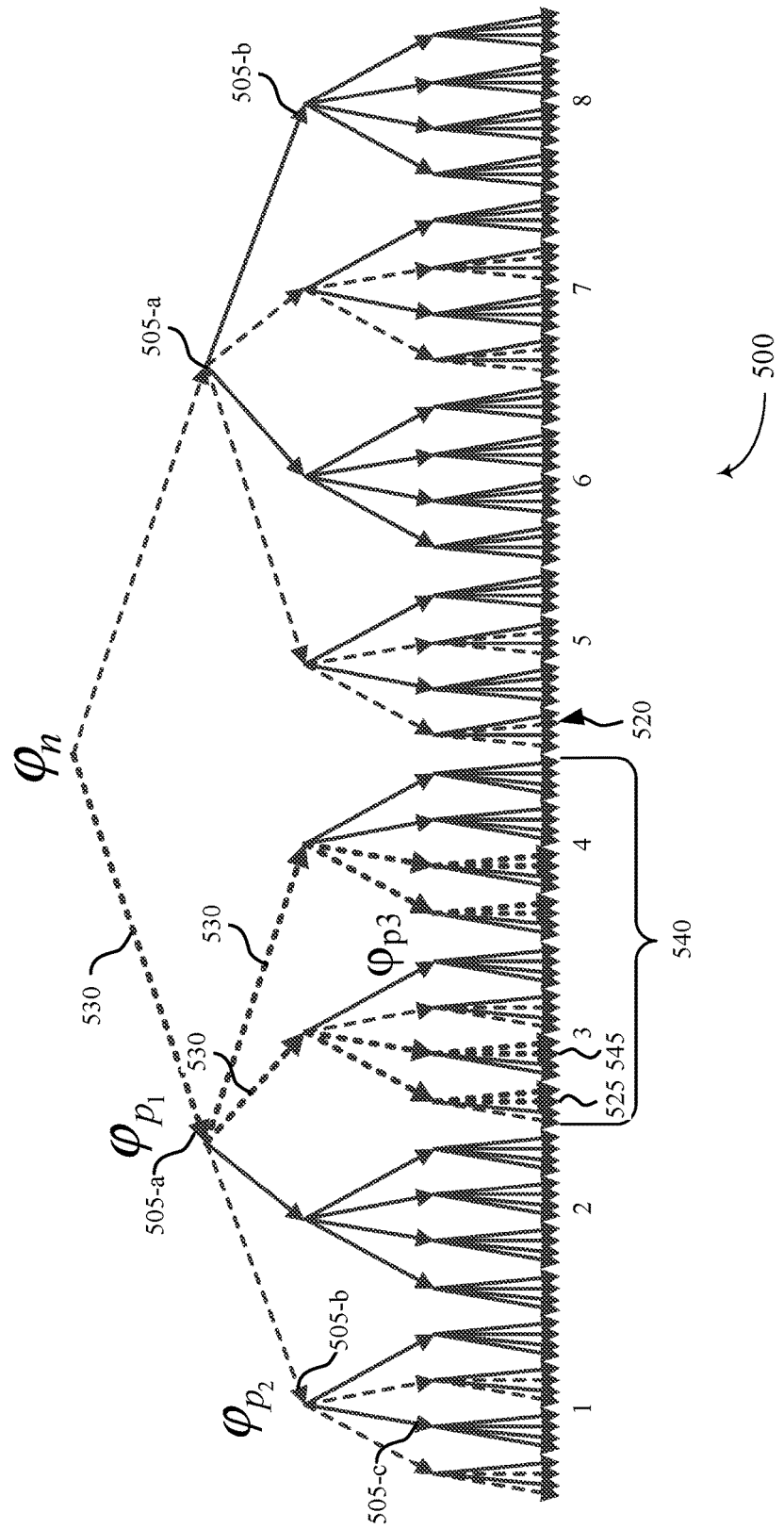

FIG. 5 illustrates an example of a precoder search tree 500 that can be used for reducing the search required for precoder selection in accordance with aspects of the present disclosure. In some examples, precoder search tree 500 may be implemented within aspects of the wireless communications system 100. Like the precoder search trees 200, 300, and 400, the precoder search tree 500 has 128 precoder hypotheses. The precoder search tree 500 has eight branches labeled 1 through 8. The precoder search tree 500 includes three different categories of nodes $\varphi_{p1}$, $\varphi_{p2}$, $\varphi_{p3}$, denoted 505-a, 505-b, and 505-c, respectively. FIG. 5 illustrates a second step in a precoder hypothesis search.

Based on the winning precoder hypothesis 425 previously found (shown in FIG. 5 as winning precoder hypothesis 525), the UE may search an additional subset 540 of the precoder hypotheses 520. In this example, seven additional precoder hypotheses in the subset 540 are searched. In the second step of the search, nodes near the winning precoder hypothesis 525 are searched. Some of the precoder hypotheses 520 in the nodes along a path 530 are included in the subset 540. A number of precoder hypotheses 520 in the subset 540 around the winning precoder hypothesis 525 are searched. Any number of additional nodes may be searched, such as three or seven. Any nodes far from the winning precoder hypothesis 525 may not be included in the search.

The co-phase factors associated with the precoder hypotheses 520 are on a circle, which implies that the phases between the precoder hypotheses 520 are also on a circle. The spacing between the precoder hypotheses 520 may be uniform and isotropic around the circle. This translates to if a precoder hypothesis at 90 degrees wins, the UE searches 90 and 180 degrees. In another example, if the winning precoder hypothesis is at 270 degrees, the UE searches 270 and 0 degrees. In some examples, those additional precoder hypotheses to be selected are selected from a same direction.

A circular rule, such as a round robin rule, may be applied to determine which additional precoder hypotheses 520 to search in some examples. Nodes to the right or left of the winning precoder hypothesis 525 may be searched. In some cases, a right-side rule or left-side rule is followed to determine which side of the winning precoder hypothesis 525 in the precoder search tree 500 is to be searched. The example of FIG. 5 shows searching to the right. For this step of the search, the UE chooses the nodes that branch on the right side of the winning precoder hypothesis 525, corresponding to branches 3 and 4. If, for example, the winning precoder hypothesis was in branches 7 or 8, the UE may choose to search additional precoder hypotheses in branches 4 and 1.

The UE may calculate channel capacities for the additional precoder hypotheses searched in subset 540. The UE may compare the channel capacities of the additional precoder hypotheses to determine a second winning precoder hypothesis 545 from the additionally searched precoder hypotheses. In some examples, the UE also includes the first winning precoder hypothesis 525 in the comparison. The UE may determine one or more co-phase factors associated with the second winning precoder hypothesis 545 and generate a PMI report based on at least these one or more co-phase factors. In some examples, the PMI report is also based on one or more co-phase factors associated with the previous round of searching. The UE transmits the PMI report based at least in part on the winning precoder hypothesis 545.

The example illustrated in FIGS. 2 through 5 pertains to a two-step search process. In this example, 128 possible calculations were reduced to just 23 calculations, while still incorporating each node. While four nodes were searched in this example, other numbers of nodes may be searched, such as two nodes. Alternatively, other numbers of calculations may be performed in other examples. Further, the process described herein can be extended to three or more search steps. In some examples, more reductions can be performed for each node. These techniques can also be applicable to larger hypothesis search spaces, for example, beyond the scope of type 1 multi-panel precoders. In such examples, the subset precoder hypothesis selection can be done in multiple modes. For example, instead of a 2-mode selection where the search space for the mode 2 depends on the winning precoder hypothesis of the mode 1, a 3-mode selection can be performed where the search space of mode 3 depends on the winning precoder hypothesis of modes 1 and 2. This can be extended to 4 or more mode selections. Furthermore, the techniques can be used for precoder selection that determines more co-phase factors than those for a type 1 multi-panel.

A similar process can be applied to any mode, rank, or precoder search space. The precoder search trees 200 through 500 provide just one example of a possible shape of a search tree. For example, the search tree could be shifted, have a different shape, have more or less nodes, and have more or less precoders. However, in some examples, the distance between the nodes may be uniform or approximately uniform. In some examples, the distance between the nodes searched is uniform or approximately uniform.

If channel capacities for each and every one of these precoder hypotheses were calculated (e.g., all of the precoder hypotheses were searched), a large number of calculations would be performed. Instead of calculating channel capacities for every precoder hypothesis, the techniques described herein allow channel capacities for only a subset of the precoder hypotheses to be calculated, while maintaining a good estimate of the channel.

Figure 6:
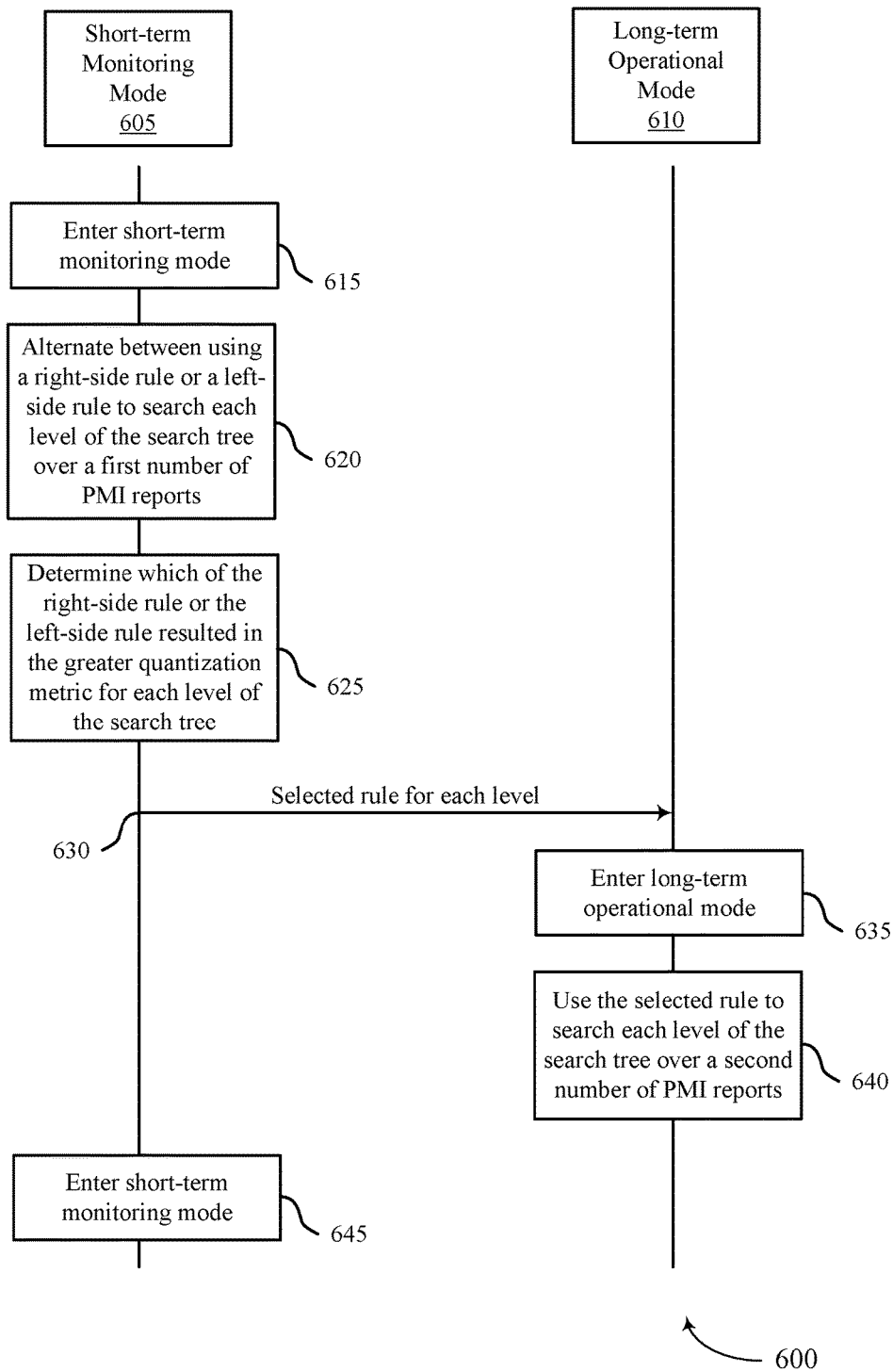
FIG. 6 illustrates an example of a process flow illustrating a short-term monitoring mode and a long-term operational mode that supports reducing hypothesis search for multi-panel precoder selection in accordance with aspects of the present disclosure.

FIG. 6 illustrates an example of a process flow 600 illustrating a short-term monitoring mode 605 and a long-term operational mode 610 that supports reducing hypothesis search for multi-panel precoder selection in accordance with aspects of the present disclosure. In some examples, the process flow 600 may be implemented in aspects of wireless communications system 100.

The process flow 600 may alternate between the short-term monitoring mode 605 and the long-term operational mode 610. The short-term monitoring mode 605 may apply to a smaller number of cycles than the long-term operational mode 610. For example, the short-term monitoring mode 605 may be used across 100 PMI reports, while the long-term operational mode 610 may be used across the next 1000 PMI reports. In other examples, other numbers of cycles or PMI reports may be used for each of the modes 605 and 610.

At 615, the UE enters the short-term monitoring mode 605. The UE may determine how many PMI reports to go through during the short-term monitoring mode 605 before switching to the long-term operational mode 610. At 620, in the short-term monitoring mode 605, the UE may perform precoder searches, alternating between using a right-side rule or a left-side rule at each level of the search tree. A right-side rule determines that those precoder hypotheses or nodes on a right side of a winning precoder hypothesis are searched in the next step. Similarly, a left-side rule determines that those precoder hypotheses or nodes on a left side of a winning precoder hypothesis are searched in the next step. Alternating between the two rules ensures that the precoder hypotheses are being adequately covered to determine which rule best suits the current channel conditions. For each level of the search tree, the UE may keep track of a quantization metric and the associated rule. This may be performed for the first number of PMI reports.

At 625, the UE determines which of the right-side rule or the left-side rule results in the greater quantization metric for each level of the search tree. For each level, the selected rule may be based at least in part on the largest quantization metric. The UE is informed of the selected rule for each level to use during the long-term operational mode 610 at 630. The UE enters the long-term operational mode 610 at 635.

At 640, the UE uses the selected rule to generate the search space for each level of the search tree. This may be performed for a second number of PMI reports, wherein the second number of PMI reports is greater than the first number of PMI reports. After the second number of PMI reports is reached, the UE re-enters the short-term monitoring mode 605 at 645.

In sum, the UE may use the short-term monitoring mode to determine a rule to use during the long-term operational mode. This allows further corners of the channel to be searched within the available precoder search space. The short-term monitoring mode may be used over a predetermined number of PMI reports, where the UE performs alternation between the right-side rule and the left-side rule at every level of the search tree. The UE keeps a record of the winning quantization (e.g., spectral efficiency) metric. Then the UE indicates at each level whether the right-side or the left-side rule amounts to a greater quantization metric. The UE switches to the long-term operational mode over a second predetermined number of PMI reports, using the winning left-side or right-side rule for each level. The UE continues this process until it reaches the next short-term monitoring mode and then to the next long-term operational mode. The short-term monitoring mode and the long-term operational mode may be periodic or aperiodic. In some examples, the UE periodically enters the monitoring mode for a short time and then continue in the operational mode for a longer time. In some examples, the right-side or left-side rule is applicable to constructing the search space of mode N with respect to the winning precoder hypothesis of mode N−1. In the short-term monitoring mode, the capacity at the end of mode N may be calculated for both right-side and left-side rules and in the long-term operational mode, the winning rule may be applied.

Figure 7:
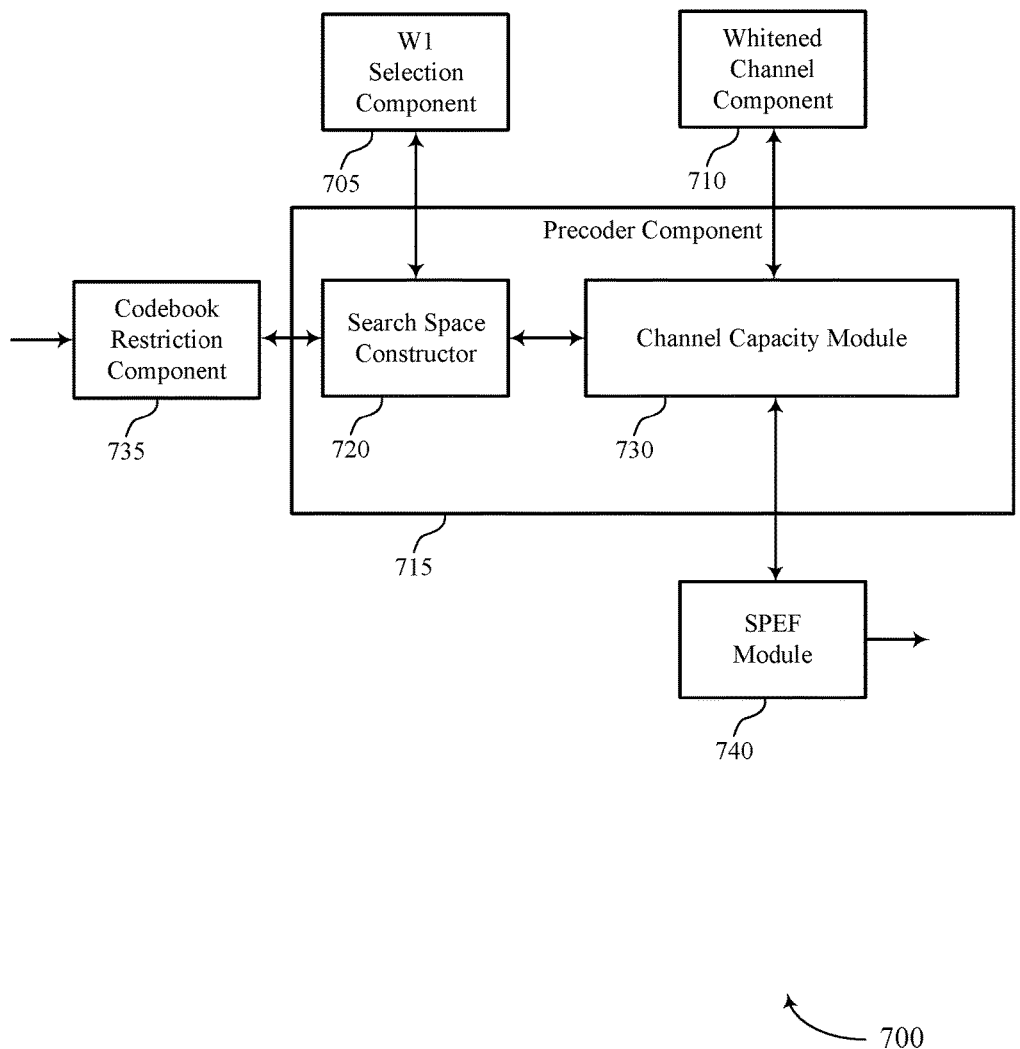
FIG. 7 illustrates an example of a block diagram of a precoder manager that supports reducing hypothesis search for multi-panel precoder selection in accordance with aspects of the present disclosure.

FIG. 7 illustrates an example of a block diagram of a precoder manager 700 that supports reducing hypothesis search for multi-panel precoder selection in accordance with aspects of the present disclosure. In some examples, block diagram of a precoder manager 700 may implement aspects of wireless communications system 100. The precoder manager 700 may also include one or more processors, memory coupled with the one or more processors, and instructions stored in the memory that are executable by the one or more processors to enable the one or more processors to perform the precoder search features discussed herein. Each of these components may be in communication with one another (e.g., via one or more buses). The precoder manager 700 may be an example of aspects of the precoder manager 140 and 815, 915, 1005, and 1110 as described herein.

The precoder manager 700 includes a W1 selection component 705, a whitened channel component 710, a precoder component 715, a codebook restriction component 735, and an SNR to fixed spectral efficiency (SPEF) mapper 740. The precoder component 715 may include a search space constructor 720 (also referred to as precoder construction) and a channel capacity module 730. The precoder component 715 may receive codebook information from the codebook restriction component 735, information regarding an index of a beam weighing vector from the W1 selection component 705, and a whitened channel component 710. The precoder component 715 may provide one or more signals to the SPEF module 740.

The search space constructor 720 may use the codebook information as well as the selected right-side or left-side rule to construct the search space. The whitened channel component 710 may perform a whitening transformation on a precoder matrix or other information.

Hypothesis reduction may be performed based on a separation of W1 and W2 selection, such as in LTE and NR. W1 selection may indicate an index of a beam weighing vector that can be used to improve spectral efficiency. W1 selection is performed prior to W2 selection. W2 selection may indicate the co-phase factors that can further improve the spectral efficiency upon interacting beam weights across different antenna ports. In NR, precoders may be determined using separate W1 selection and W2 selection. Some of the complexity in the precoder hypotheses search is introduced in W2 selection. Techniques described herein can be applied to simplify the W2 selection. W2 selection with NR precoders can be much more complex compared to W2 selection in LTE.

The precoder manager 700 may determine a quantization metric. The quantization metric may be an estimate of the achievable spectral efficiency of a receiver based on different the precoder matrices within the search space. The quantization metric is generally any metric that can translate (e.g., in a monotonic manner) to an achievable throughput by the communications system. As described herein, the quantization metric may be the achievable spectral efficiency upon applying each precoder matrix. However, the techniques described herein are applicable to search space reduction for any monotonic quantization metric. That is, this search space reduction technique can apply to any monotonic quantization metric that can estimate an achievable throughput at the receiver or an achievable system capacity.

Figure 8:
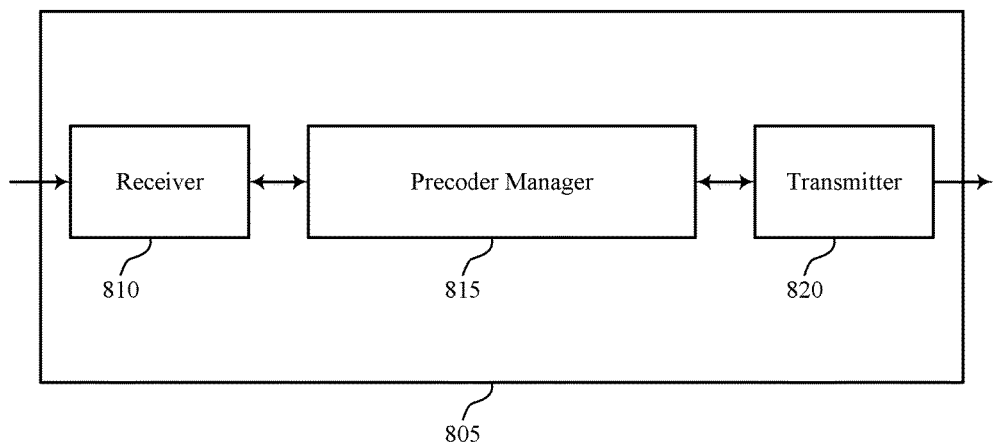
FIGS. 8 and 9 show block diagrams of devices that support reducing hypothesis search for multi-panel precoder selection in accordance with aspects of the present disclosure.

FIG. 8 shows a block diagram 800 of a device 805 that supports reducing hypothesis search for multi-panel precoder selection in accordance with aspects of the present disclosure. The device 805 may be an example of aspects of a UE 115 as described herein. The device 805 may include a receiver 810, a precoder manager 815, and a transmitter 820. The device 805 may also include one or more processors, memory coupled with the one or more processors, and instructions stored in the memory that are executable by the one or more processors to enable the one or more processors to perform the precoder search features discussed herein. Each of these components may be in communication with one another (e.g., via one or more buses).

The receiver 810 may receive information such as packets, user data, or control information associated with various information channels (e.g., control channels, data channels, and information related to reducing hypothesis search for multi-panel precoder selection, etc.). Information may be passed on to other components of the device 805. The receiver 810 may receive one or more signals from another wireless device, such as a base station, upon which the techniques described herein use to determine the channel information. The receiver 810 may be an example of aspects of the transceiver 1120 described with reference to FIG. 11. The receiver 810 may utilize a single antenna or a set of antennas, which may include one or more multi-panel antennas.

The precoder manager 815 may implement the techniques described herein to determine one or more winning precoder hypotheses based at least in part on a reduced search space, and generate one or more PMI reports based at least in part on one or more co-phase factors associated with the winning precoder hypotheses. For example, the precoder manager 815 may calculate channel capacities for a first subset of first channel capacities for each precoder hypothesis of a first subset of precoder hypotheses. The precoder manager 815 may select a first precoder hypothesis of the first subset of precoder hypotheses based on the calculated first channel capacities as a winning precoder hypothesis. The precoder manager 815 may select one or more grouping co-phase factors based on the first precoder hypothesis. The precoder manager 815 may generate a PMI report based on the first winning precoder hypothesis.

The precoder manager 815 may calculate one or more second channel capacities for each precoder hypothesis of a second subset of precoder hypotheses, where the second subset of precoder hypotheses are selected based on the first winning precoder hypothesis. The precoder manager 815 may select a second winning precoder hypothesis of the second subset of precoder hypotheses based on the calculated second channel capacities. The precoder manager 815 may select one or more additional grouping co-phase factors based on the second winning precoder hypothesis. The precoder manager 815 may generate a PMI report based on the second winning precoder hypothesis. In some examples, the precoder manager 815 may generate a single PMI report based at least in part on both the first and the second winning precoder hypotheses. The precoder manager 815 may be an example of aspects of the precoder managers 140 and 1110 described herein.

The precoder manager 815, or its sub-components, may be implemented in hardware, code (e.g., software or firmware) executed by a processor, or any combination thereof. If implemented in code executed by a processor, the functions of the precoder manager 815, or its sub-components may be executed by a general-purpose processor, a DSP, an application-specific integrated circuit (ASIC), a field-programmable gate array (FPGA) or other programmable logic device, discrete gate or transistor logic, discrete hardware components, or any combination thereof designed to perform the functions described in the present disclosure.

The precoder manager 815, or its sub-components, may be physically located at various positions, including being distributed such that portions of functions are implemented at different physical locations by one or more physical components. In some examples, the precoder manager 815, or its sub-components, may be a separate and distinct component in accordance with various aspects of the present disclosure. In some examples, the precoder manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. For example, the transmitter 820 may transmit PMI reports that indicate precoder indexes based on the one or more grouping co-phase factors. In some examples, the transmitter 820 may be collocated with a receiver 810 in a transceiver module. For example, the transmitter 820 may be an example of aspects of the transceiver 1120 described with reference to FIG. 11.

The transmitter 820 may utilize a single antenna or a set of antennas, which may include one or more multi-panel antennas.

Figure 9:
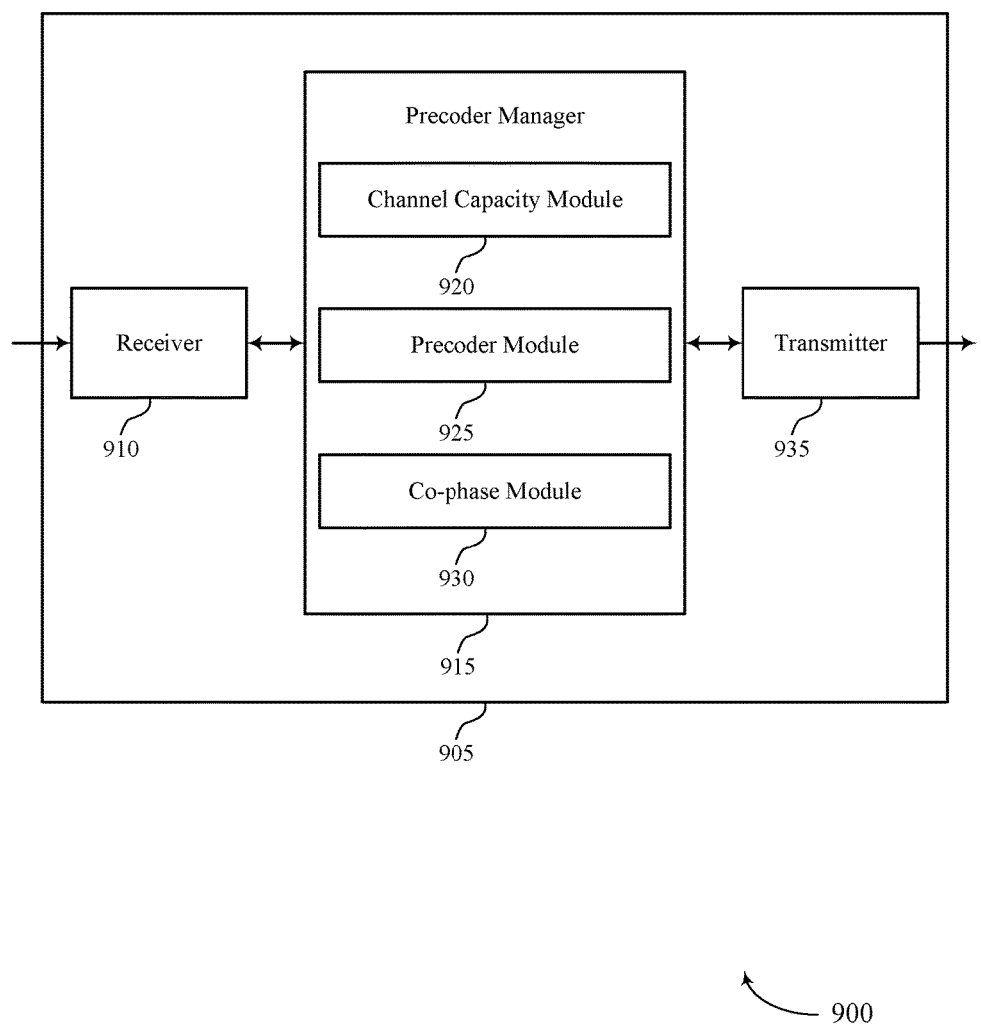

FIG. 9 shows a block diagram 900 of a device 905 that supports reducing hypothesis search for multi-panel precoder selection in accordance with aspects of the present disclosure. The device 905 may be an example of aspects of a device 805, or a UE 115 as described herein. The device 905 may include a receiver 910, a precoder manager 915, and a transmitter 940. The device 905 may also include one or more processors, memory coupled with the one or more processors, and instructions stored in the memory that are executable by the one or more processors to enable the one or more processors to perform the precoder search features discussed herein. Each of these components may be in communication with one another (e.g., via one or more buses).

The receiver 910 may receive information such as packets, user data, or control information associated with various information channels (e.g., control channels, data channels, and information related to reducing hypothesis search for multi-panel precoder selection, etc.). Information may be passed on to other components of the device 905. The receiver 910 may be an example of aspects of the transceiver 1120 described with reference to FIG. 11. The receiver 910 may utilize a single antenna or a set of antennas.

The precoder manager 915 may be an example of aspects of the precoder manager 140 and 815 as described herein. The precoder manager 915 may include a channel capacity module 920, a precoder module 925, and a co-phase module 930. The precoder manager 915 may be an example of aspects of the precoder manager 140 and 1110 described herein. For example, a processor may implement some or all of the operations of the precoder manager 915, including a channel capacity module 920, a precoder module 925, and a co-phase module 930. In some cases, the precoder manager 915 may be a processor. The processor may be coupled with memory and execute instructions stored in the memory that enable the processor to perform or facilitate the precoder search features discussed herein.

The channel capacity module 920 may calculate channel capacities for precoder hypotheses. For example, the channel capacity module 920 may calculate one or more first channel capacities for each precoder hypothesis of a first subset of precoder hypotheses. The channel capacity module 920 may also calculate one or more second channel capacities for each precoder hypothesis of a second subset of precoder hypotheses, where the second subset of precoder hypotheses are selected based on the first precoder hypothesis.

The precoder module 925 may select the winning precoder hypotheses based on comparing the calculated channel capacities. For example, the precoder module 925 may select a first precoder hypothesis of the first subset of precoder hypotheses based at least in part on the calculated first channel capacities. The precoder module 925 may also select a second precoder hypothesis of the second subset of precoder hypotheses based on at least in part on the calculated second channel capacities.

The co-phase module 930 may select one or more grouping co-phase factors based on the winning precoder hypotheses. In some examples, the co-phase module 930 may select one or more grouping co-phase factors based on either just a winning precoder hypothesis from each search mode, or based on two or more of the winning precoder hypotheses from two or more search modes.

The transmitter 935 may transmit signals generated by other components of the device 905. The transmitter 935 may transmit, by the UE, a first PMI report that indicates a first precoder index based on the one or more grouping co-phase factors. In some examples, the transmitter 935 may be collocated with a receiver 910 in a transceiver module. For example, the transmitter 935 may be an example of aspects of the transceiver 1120 described with reference to FIG. 11. The transmitter 935 may utilize a single antenna or a set of antennas.

Figure 10:
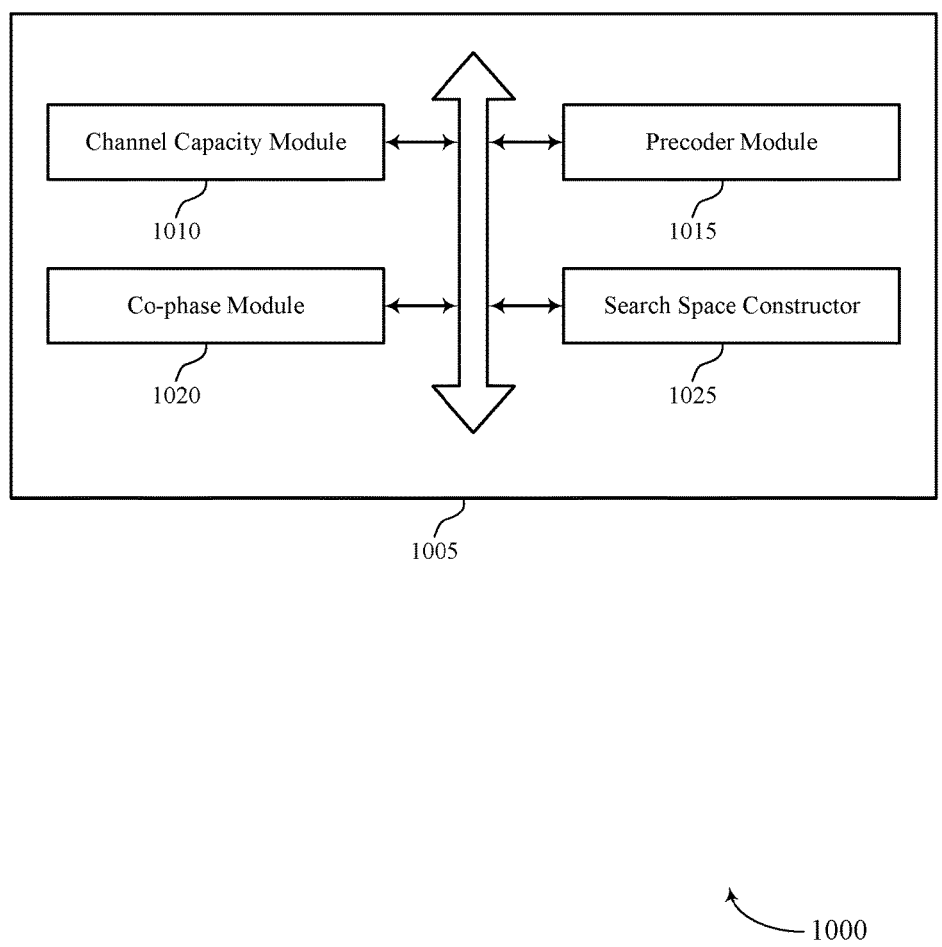
FIG. 10 shows a block diagram of a precoder manager that supports reducing hypothesis search for multi-panel precoder selection in accordance with aspects of the present disclosure.

FIG. 10 shows a block diagram 1000 of a precoder manager 1005 that supports reducing hypothesis search for multi-panel precoder selection in accordance with aspects of the present disclosure. The precoder manager 1005 may be an example of aspects of a precoder manager 140, a precoder manager 815, a precoder manager 915, or a precoder manager 1110 described herein. The precoder manager 1005 may include a channel capacity module 1010, a precoder module 1015, a co-phase module 1020, and a search space constructor 1025. Each of these modules may communicate, directly or indirectly, with one another (e.g., via one or more buses).

The channel capacity module 1010 may calculate one or more first channel capacities for each precoder hypothesis of a first subset of precoder hypotheses. In some examples, the channel capacity module 1010 may calculate one or more second channel capacities for each precoder hypothesis of a second subset of precoder hypotheses, where the second subset of precoder hypotheses are selected based on the first precoder hypothesis. In some examples, the channel capacity module 1010 may calculate third channel capacities for each precoder hypothesis of a third subset of precoder hypotheses, where the third subset of precoder hypotheses are selected based at least in part on one or more of the first and second precoder hypothesis. In other examples, the channel capacity module 1010 may calculate additional channel capacities for additional search modes.

In calculating the first channel capacities, the channel capacity module 1010 may calculate the first channel capacities for a subset of precoder hypotheses associated with each node of a first group of nodes. The first group of node may be determined using a right-side or a left-side rule.

The precoder module 1015 may select a first precoder hypothesis of the first subset of precoder hypotheses based on the calculated first channel capacities. the precoder module 1015 may determine that the first precoder hypothesis is associated with a first node of the first group of nodes. In some examples, the precoder module 1015 may determine a precoder hypothesis with a highest channel capacity.

In some examples, the precoder module 1015 may select a second precoder hypothesis of the second subset of precoder hypotheses based on the calculated second channel capacities. The precoder module 1015 may select precoder hypotheses from one or more nodes for the first group of nodes to include in the second subset of precoder hypotheses based on proximity of the one or more nodes to the first node. In some examples, the precoder module 1015 may select the precoder hypothesis with the highest channel capacity as the first precoder hypothesis.

The co-phase module 1020 may select one or more grouping co-phase factors based at least in part on the first precoder hypothesis or the second precoder hypothesis. In some examples, the co-phase module 1020 may select one or more second grouping co-phase factors based on the second precoder hypothesis. The co-phase module 1020 may select one or more grouping co-phase factors for each channel rank. The co-phase module 1020 may also generate one or more PMI reports that indicate a first or more precoder indexes based on the one or more grouping co-phase factors.

The search space constructor 1025 may determine the shape and size of the search space for the precoder hypotheses. The search space constructor 1025 may construct the search space during a short-term monitoring step and then use a right-side or a left-side rule during a long-term operational mode for the searching.

The search space constructor 1025 may enter a short-term monitoring mode. During the short-term monitoring mode, the search space constructor 1025 may select one of a right-side rule or a left-side rule. The search space constructor 1025 may alternate between using the right-side rule or the left-side rule for consecutive PMI reports, and keep track of which rule resulted in a greater channel efficiency or greater channel capacity. Selecting the rule that had the higher channel efficiency or capacity, the search space constructor 1025 can build the search space for the long-term operational mode.

In some examples, the search space constructor 1025 may determine a quantization metric between the first subset of precoder hypotheses and the second subset of precoder hypotheses. In some examples, the search space constructor 1025 may select the right-side rule or the left-side rule based on the quantization metric. The search space constructor 1025 may enter a long-term operational mode using the selected right-side rule or left-side rule. In some examples, the search space constructor 1025 may construct the first subset of precoder hypotheses using the selected right-side rule or the left-side rule.

The search space constructor 1025 may determine the first subset of precoder hypotheses using one of the selected right-side rule or the left-side rule. In some examples, the search space constructor 1025 may determine the second subset of precoder hypotheses using the other one of the right-side rule or the left-side rule. In some examples, the search space constructor 1025 may construct the second subset of precoder hypotheses using the selected right-side rule or the left-side rule. In some examples, the search space constructor 1025 may apply the selected right-side rule or the left-side rule for selecting at least one of the first subset of precoder hypotheses or the second subset of precoder hypotheses.

Figure 11:
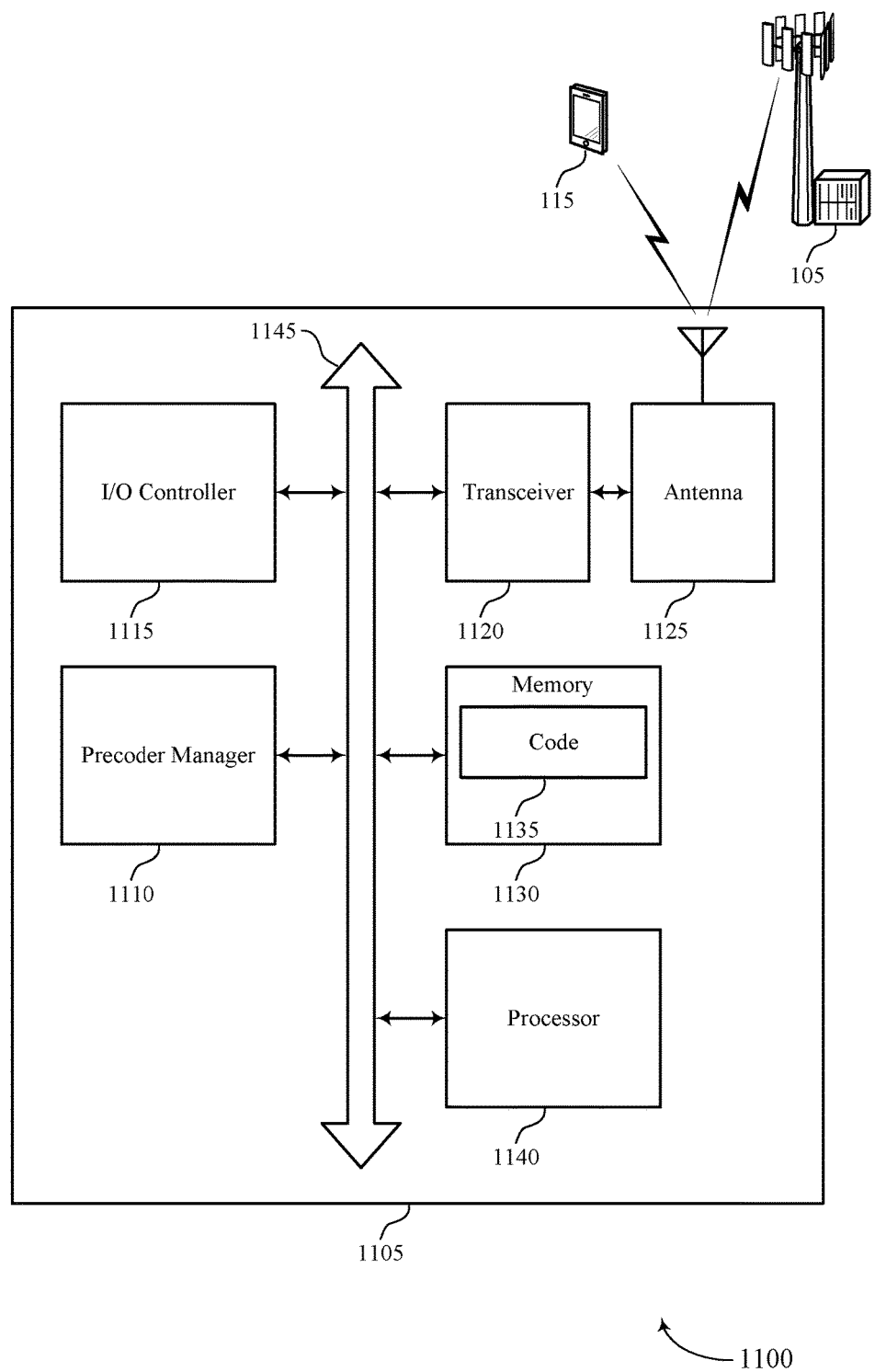
FIG. 11 shows a diagram of a system including a device that supports reducing hypothesis search for multi-panel precoder selection in accordance with aspects of the present disclosure.

FIG. 11 shows a diagram of a system 1100 including a device 1105 that supports reducing hypothesis search for multi-panel precoder selection in accordance with aspects of the present disclosure. The device 1105 may be an example of or include the components of device 805, device 905, or a UE 115 as described herein. The device 1105 may include components for bi-directional voice and data communications including components for transmitting and receiving communications, including a precoder manager 1110, an I/O controller 1115, a transceiver 1120, an antenna 1125, memory 1130, and a processor 1140. These components may be in electronic communication via one or more buses (e.g., bus 1145).

The precoder manager 1110 may calculate one or more first channel capacities for each precoder hypothesis of a first subset of precoder hypotheses. The precoder manager 1110 may calculate one or more second channel capacities for each precoder hypothesis of a second subset of precoder hypotheses, where the second subset of precoder hypotheses are selected based at least in part on the first precoder hypothesis. The precoder manager 1110 may also select a first precoder hypothesis of the first subset of precoder hypotheses based at least in part on the calculated first channel capacities and select a second precoder hypothesis of the second subset of precoder hypotheses based at least in part on the calculated second channel capacities. The precoder manager 1110 may select one or more grouping co-phase factors based on the first precoder hypothesis, and transmit a first PMI report that indicates a first precoder index based at least in part on the one or more grouping co-phase factors.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting reducing an hypothesis search for multi-panel precoder selection).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
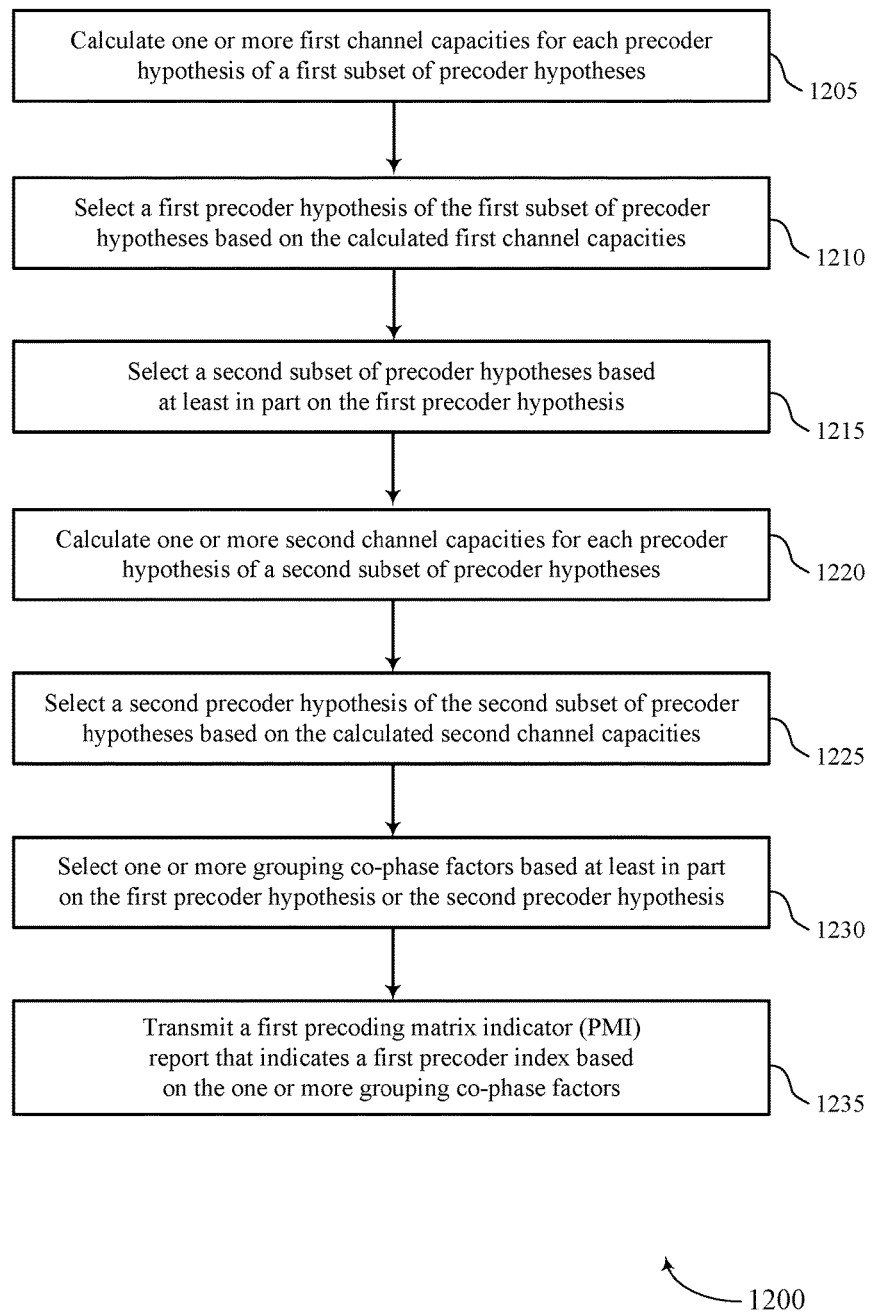
FIGS. 12 through 15 show flowcharts illustrating methods that support reducing hypothesis search for multi-panel precoder selection in accordance with aspects of the present disclosure.

FIG. 12 shows a flowchart illustrating a method 1200 that supports reducing hypothesis search for multi-panel precoder selection in accordance with aspects of the present disclosure. The operations of method 1200 may be implemented by a UE 115 or its components as described herein. For example, the operations of method 1200 may be performed by a precoder manager as described with reference to FIGS. 1 and 7 through 11. In some examples, a UE may execute a set of instructions to control the functional elements of the UE to perform the functions described below. Additionally or alternatively, a UE may perform aspects of the functions described below using special-purpose hardware.

At 1205, the UE may calculate one or more first channel capacities for each precoder hypothesis of a first subset of precoder hypotheses. The operations of 1205 may be performed according to the methods described herein. In some examples, aspects of the operations of 1205 may be performed by a channel capacity module as described with reference to FIGS. 1 and 7 through 11.

At 1210, the UE may select a first precoder hypothesis of the first subset of precoder hypotheses based on the calculated first channel capacities. The operations of 1210 may be performed according to the methods described herein. In some examples, aspects of the operations of 1210 may be performed by a precoder module as described with reference to FIGS. 1 and 7 through 11.

At 1215, the UE select a second subset of precoder hypotheses based at least in part on the first precoder hypothesis. The operations of 1215 may be performed according to the methods described herein. In some examples, aspects of the operations of 1215 may be performed by a channel capacity module as described with reference to FIGS. 1 and 7 through 11.

At 1220, the UE may calculate one or more second channel capacities for each precoder hypothesis of a second subset of precoder hypotheses. The operations of 1220 may be performed according to the methods described herein. In some examples, aspects of the operations of 1220 may be performed by a channel capacity module as described with reference to FIGS. 1 and 7 through 11.

At 1225, the UE may select a second precoder hypothesis of the second subset of precoder hypotheses based on the calculated second channel capacities. The operations of 1225 may be performed according to the methods described herein. In some examples, aspects of the operations of 1225 may be performed by a precoder module as described with reference to FIGS. 1 and 7 through 11.

At 1230, the UE may select one or more grouping co-phase factors based at least in part on the first precoder hypothesis or the second precoder hypothesis. In some examples, the one or more co-phase factors is based on just one of the first precoder hypothesis and the second precoder hypothesis. In other examples, the one or more co-phase factors is based on both the first precoder hypothesis and the second precoder hypothesis. The operations of 1230 may be performed according to the methods described herein. In some examples, aspects of the operations of 1230 may be performed by a co-phase module as described with reference to FIGS. 1 and 7 through 11.

At 1235, the UE may transmit a first PMI report that indicates a first precoder index based on the one or more grouping co-phase factors. The operations of 1235 may be performed according to the methods described herein. In some examples, aspects of the operations of 1235 may be performed by a transmitter as described with reference to FIGS. 1 and 7 through 11.

Figure 13:
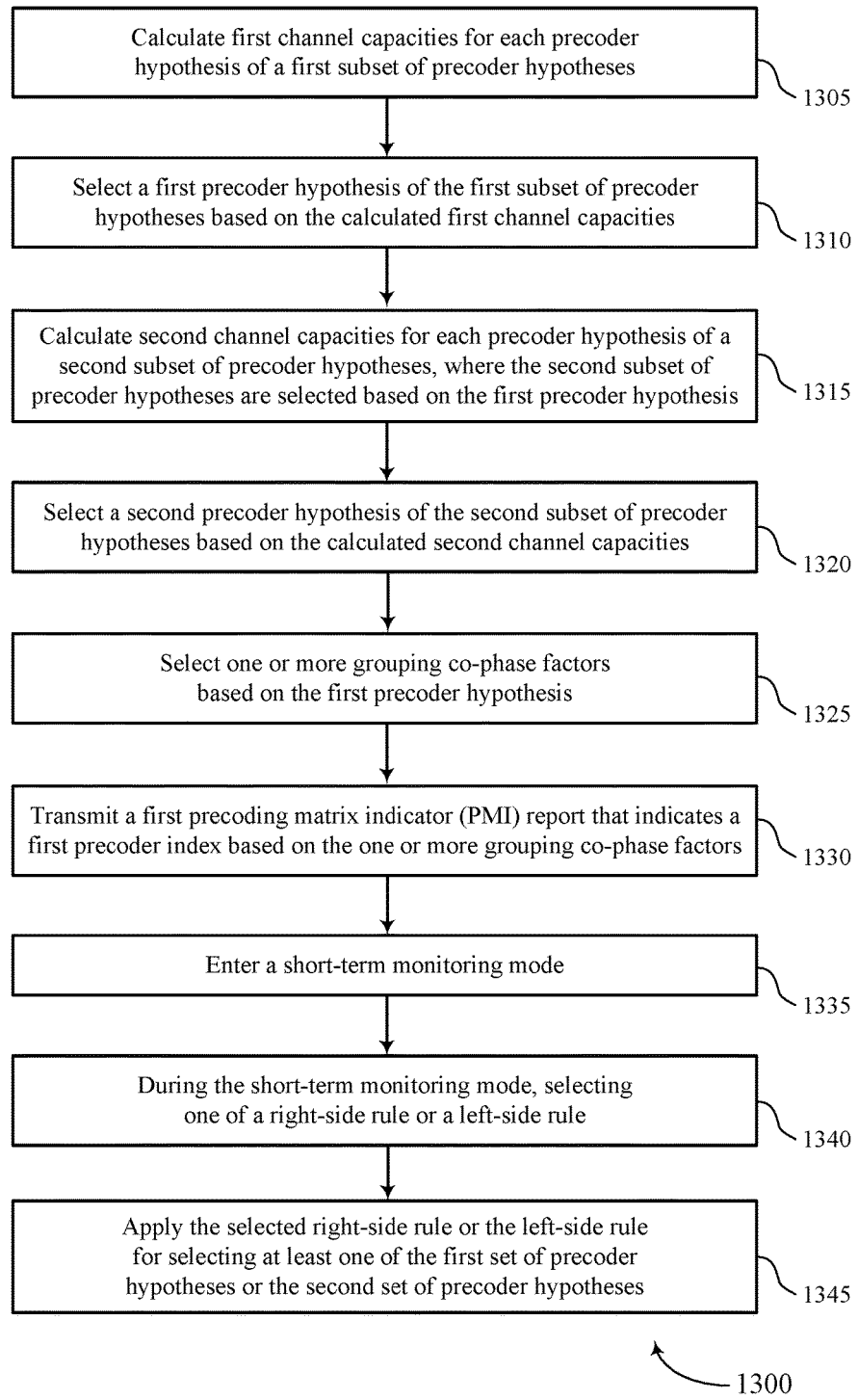

FIG. 13 shows a flowchart illustrating a method 1300 that supports reducing hypothesis search for multi-panel precoder selection in accordance with aspects of the present disclosure. The operations of method 1300 may be implemented by a UE 115 or its components as described herein. For example, the operations of method 1300 may be performed by a precoder manager as described with reference to FIGS. 1 and 7 through 11. In some examples, a UE may execute a set of instructions to control the functional elements of the UE to perform the functions described below. Additionally or alternatively, a UE may perform aspects of the functions described below using special-purpose hardware.

At 1305, the UE may calculate one or more first channel capacities for each precoder hypothesis of a first subset of precoder hypotheses. The operations of 1305 may be performed according to the methods described herein. In some examples, aspects of the operations of 1305 may be performed by a channel capacity module as described with reference to FIGS. 1 and 7 through 11.

At 1310, the UE may select a first precoder hypothesis of the first subset of precoder hypotheses based on the calculated first channel capacities. The operations of 1310 may be performed according to the methods described herein. In some examples, aspects of the operations of 1310 may be performed by a precoder module as described with reference to FIGS. 1 and 7 through 11.

At 1315, the UE may calculate one or more second channel capacities for each precoder hypothesis of a second subset of precoder hypotheses, where the second subset of precoder hypotheses are selected based on the first precoder hypothesis. The operations of 1315 may be performed according to the methods described herein. In some examples, aspects of the operations of 1315 may be performed by a channel capacity module as described with reference to FIGS. 1 and 7 through 11.

At 1320, the UE may select a second precoder hypothesis of the second subset of precoder hypotheses based on the calculated second channel capacities. The operations of 1320 may be performed according to the methods described herein. In some examples, aspects of the operations of 1320 may be performed by a precoder module as described with reference to FIGS. 1 and 7 through 11.

At 1325, the UE may select one or more grouping co-phase factors based on the first precoder hypothesis. The operations of 1325 may be performed according to the methods described herein. In some examples, aspects of the operations of 1325 may be performed by a co-phase module as described with reference to FIGS. 1 and 7 through 11.

At 1330, the UE may transmit a first PMI report that indicates a first precoder index based on the one or more grouping co-phase factors. The operations of 1330 may be performed according to the methods described herein. In some examples, aspects of the operations of 1330 may be performed by a transmitter as described with reference to FIGS. 1 and 7 through 11.

At 1335, the UE may enter a short-term monitoring mode. The operations of 1335 may be performed according to the methods described herein. In some examples, aspects of the operations of 1335 may be performed by a search space constructor as described with reference to FIGS. 1 and 7 through 11.

At 1340, the UE may during the short-term monitoring mode, selecting one of a right-side rule or a left-side rule. The operations of 1340 may be performed according to the methods described herein. In some examples, aspects of the operations of 1340 may be performed by a search space constructor as described with reference to FIGS. 1 and 7 through 11.

At 1345, the UE may apply the selected right-side rule or the left-side rule for selecting at least one of the first subset of precoder hypotheses or the second subset of precoder hypotheses. The operations of 1345 may be performed according to the methods described herein. In some examples, aspects of the operations of 1345 may be performed by a search space constructor as described with reference to FIGS. 1 and 7 through 11.

Figure 14:
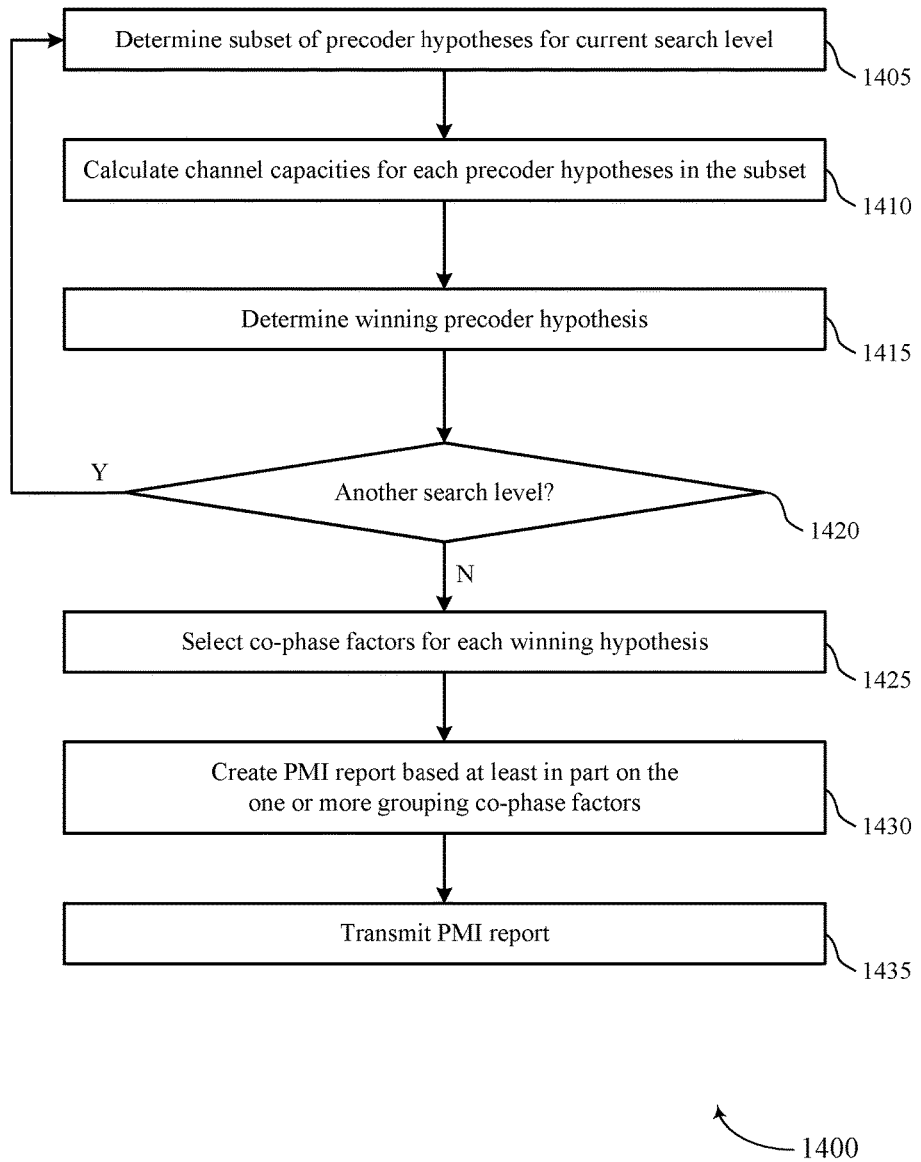

FIG. 14 shows a flowchart illustrating a method 1400 that supports reducing hypothesis search for multi-panel precoder selection in accordance with aspects of the present disclosure. The operations of method 1400 may be implemented by a UE 115 or its components as described herein. For example, the operations of method 1400 may be performed by a precoder manager as described with reference to FIGS. 1 and 7 through 11. In some examples, a UE may execute a set of instructions to control the functional elements of the UE to perform the functions described below. Additionally or alternatively, a UE may perform aspects of the functions described below using special-purpose hardware. In some examples, the UE performs the method 1400 in either the short-term monitoring mode or the long-term operating mode.

At 1405, the UE may determine a subset of the precoder hypotheses for a current search level. The UE may determine the subset of nodes to search based on a previously selected right-side or left-side rule. In some examples, such as during the short-term monitoring mode, the UE alternates between the right-side and left-side rules. In other examples, such as during the long-term operational mode, the UE uses the selected right-side and left-side rule for each search level that was determined during the short-term monitoring mode. In some examples, the subset is based on a subset from a previous search level. The operations of 1405 may be performed according to the methods described herein. In some examples, aspects of the operations of 1405 may be performed by a precoder module as described with reference to FIGS. 1 and 7 through 11.

At 1410, the UE may calculate channel capacities for each precoder hypothesis of the subset of precoder hypotheses. The operations of 1410 may be performed according to the methods described herein. In some examples, aspects of the operations of 1410 may be performed by a channel capacity module as described with reference to FIGS. 1 and 7 through 11.

At 1415, the UE may determine a winning precoder hypothesis based on the calculated channel capacities of the precoder hypotheses searched at that search level. In some examples, the UE may also generate and transmit a PMI report based on co-phase factors associated with the winning precoder hypothesis. The operations of 1415 may be performed according to the methods described herein. In some examples, aspects of the operations of 1415 may be performed by a channel capacity module as described with reference to FIGS. 1 and 7 through 11.

At 1420, the UE may determine whether there is another level to search. If so, the method 1400 returns to 1405 of performs those steps again for the next search level. If not, the method 1400 proceeds to 1425. The operations of 1420 may be performed according to the methods described herein. In some examples, aspects of the operations of 1420 may be performed by a precoder manager as described with reference to FIGS. 1 and 7 through 11.

At 1425, the UE may select one or more grouping co-phase factors based on the winning precoder hypotheses for each search level. In some examples, one or more grouping co-phase factors are selected only for a first search level. In other examples, one or more grouping co-phase factors are selected only for a last search level. In yet another example, one or more grouping co-phase factors are selected only for any or all of the search levels. The operations of 1425 may be performed according to the methods described herein. In some examples, aspects of the operations of 1425 may be performed by a co-phase module as described with reference to FIGS. 1 and 7 through 11.

At 1430, the UE may create a PMI report for the one or more grouping co-phase factors. The operations of 1430 may be performed according to the methods described herein. In some examples, aspects of the operations of 1430 may be performed by a co-phase module as described with reference to FIGS. 1 and 7 through 11.

At 1435, the UE may transmit a PMI report that indicates a precoder index based on the one or more grouping co-phase factors. The operations of 1435 may be performed according to the methods described herein. In some examples, aspects of the operations of 1435 may be performed by a transmitter as described with reference to FIGS. 1 and 7 through 11.

Figure 15:
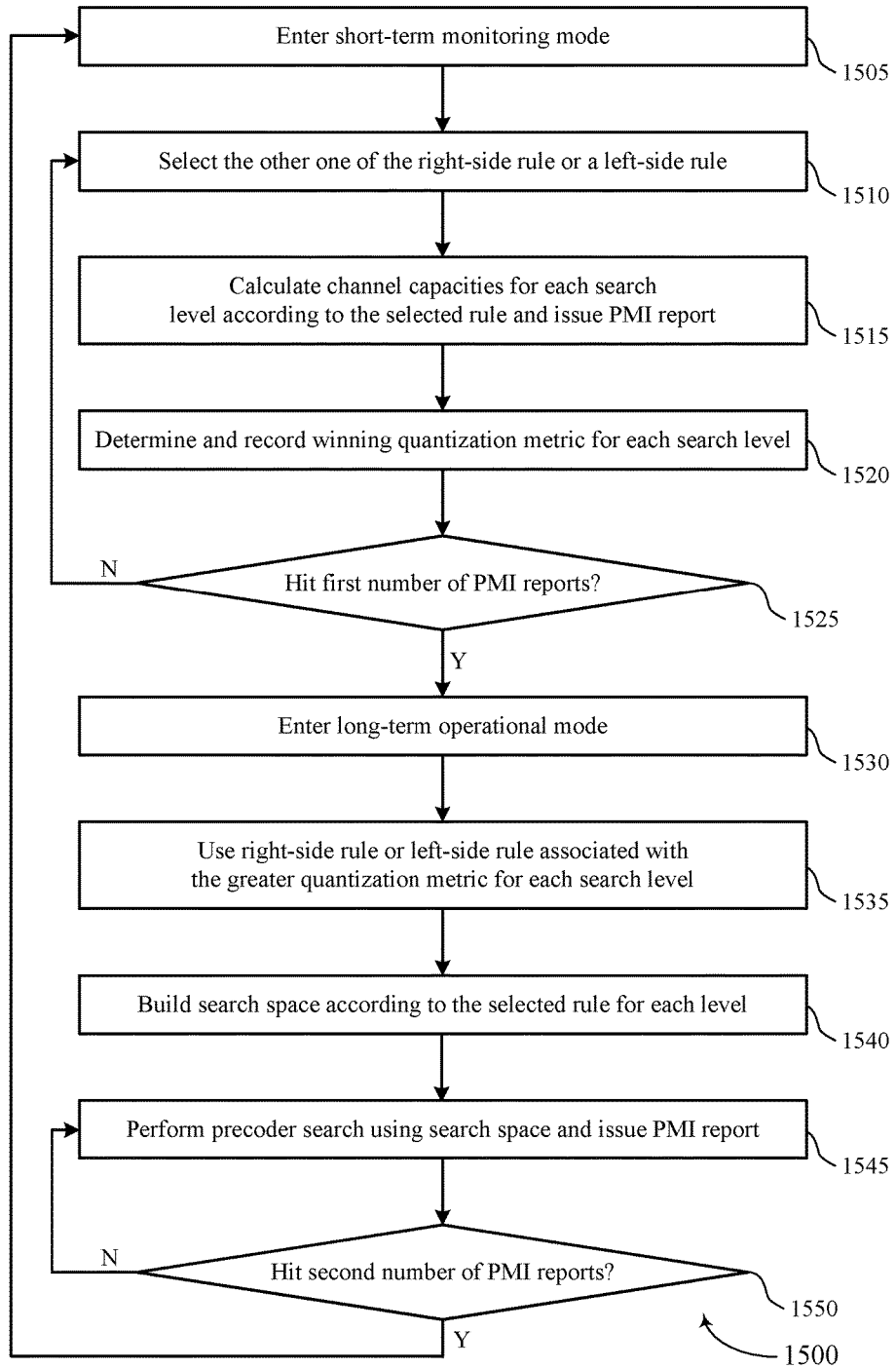

FIG. 15 shows a flowchart illustrating a method 1500 that supports reducing hypothesis search for multi-panel precoder selection in accordance with aspects of the present disclosure. The operations of method 1500 may be implemented by a UE 115 or its components as described herein. For example, the operations of method 1500 may be performed by a precoder manager as described with reference to FIGS. 1 and 7 through 11. In some examples, a UE may execute a set of instructions to control the functional elements of the UE to perform the functions described below. Additionally or alternatively, a UE may perform aspects of the functions described below using special-purpose hardware.

At 1505, the UE may enter a short-term monitoring mode. The short-term monitoring mode may apply to a first number of PMI reports, and may be used to determine which of the right-side rule or the left-side rule to use during a next long-term operational mode. The operations of 1505 may be performed according to the methods described herein. In some examples, aspects of the operations of 1505 may be performed by a search space constructor as described with reference to FIGS. 1 and 7 through 11.

At 1510, the UE may select the other of the right-side rule or the left-side rule based on a previous rule selection. If there has not been a previous rule selection, or this is performed immediately upon entering the short-term monitoring mode, one of the rules may be selected randomly or based on a predetermined rule selection. The operations of 1510 may be performed according to the methods described herein. In some examples, aspects of the operations of 1510 may be performed by a search space constructor as described with reference to FIGS. 1 and 7 through 11.

At 1515, the UE may calculate channel capacities for each precoder hypothesis of each search level according to the selected rule. The UE may also issue one or more PMI reports accordingly. The operations of 1515 may be performed according to the methods described herein. In some examples, aspects of the operations of 1515 may be performed by a channel capacity module as described with reference to FIGS. 1 and 7 through 11.

At 1520, the UE may determine and record a winning quantization metric for each search level. The winning quantization metric may be based on at least one or more winning hypotheses from the previously searched levels. The operations of 1520 may be performed according to the methods described herein. In some examples, aspects of the operations of 1520 may be performed by a channel capacity module as described with reference to FIGS. 1 and 7 through 11.

At 1525, the UE determines whether a first number of PMI reports has been transmitted during the short-term monitoring mode. In one example, the first number of PMI reports is 100. In other examples, other numbers of PMI reports may be used. If the UE has not yet hit the number of PMI reports for the short-term monitoring mode, the UE repeats steps 1510, 1515, 1520, and 1525. Once the UE has sent out the first number of PMI reports during the short-term monitoring mode, the UE proceeds to 1530. The operations of 1525 may be performed according to the methods described herein. In some examples, aspects of the operations of 1525 may be performed by a precoder manager as described with reference to FIGS. 1 and 7 through 11.

At 1530, the UE enters a long-term operational mode. The operations of 1530 may be performed according to the methods described herein. In some examples, aspects of the operations of 1530 may be performed by a search space constructor as described with reference to FIGS. 1 and 7 through 11.

At 1535, the UE may use the right-side rule, or the left-side rule based at least in part on the winning quantization metric for the short-term monitoring mode. The UE may determine which rule to use based on comparing the winning quantization metric for each search made during the short-term monitoring mode. The operations of 1535 may be performed according to the methods described herein. In some examples, aspects of the operations of 1535 may be performed by a search space constructor as described with reference to FIGS. 1 and 7 through 11.

At 1540, the UE may build the search space according to the selected rule for each search level. The UE may use the selected rule to build the search space to be used during the long-term operational mode. In some examples, the selected rule may be determined separately, and may be different, for each different search level. The operations of 1540 may be performed according to the methods described herein. In some examples, aspects of the operations of 1540 may be performed by a search space constructor as described with reference to FIGS. 1 and 7 through 11.

At 1545, the UE may perform the precoder search using the built search space and issue a PMI report as described herein. The operations of 1545 may be performed according to the methods described herein. In some examples, aspects of the operations of 1545 may be performed by a precoder manager as described with reference to FIGS. 1 and 7 through 11.

At 1550, UE determines whether a second number of PMI reports has been transmitted during the long-term operational mode. In one example, the second number of PMI reports is 10000. In other examples, other numbers of PMI reports may be used. If the UE has not yet hit the second number of PMI reports for the long-term operational mode, the UE repeats steps 1545 and 1550 until the number is reached. Once the UE has sent out the second number of PMI reports during the long-term operational mode, the UE proceeds to 1505 to re-enter the short-term monitoring mode. By repeating the short-term monitoring mode, the UE ensures that it is using the appropriate right-side or left-side rule for the current channel conditions. The operations of 1550 may be performed according to the methods described herein. In some examples, aspects of the operations of 1550 may be performed by a search space constructor as described with reference to FIGS. 1 and 7 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, a FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications, comprising:
   a processor,
   memory in electronic communication with the processor; and
   instructions stored in the memory and executable by the processor to cause the apparatus to:
      calculate one or more first channel capacities for each precoder hypothesis of a first subset of precoder hypotheses;

select a first precoder hypothesis of the first subset of precoder hypotheses based at least in part on the calculated first channel capacities;

select a second subset of precoder hypotheses based at least in part on the first precoder hypothesis;

calculate one or more second channel capacities for each precoder hypothesis of the second subset of precoder hypotheses;

select a second precoder hypothesis of the second subset of precoder hypotheses based at least in part on the calculated second channel capacities;

select one or more grouping co-phase factors based at least in part on the first precoder hypothesis or the second precoder hypothesis; and transmit a first precoding matrix indicator (PMI) report that indicates a first precoder index based at least in part on the one or more grouping co-phase factors.

2. The apparatus of claim 1, wherein the first subset of precoder hypotheses comprises two or more precoder hypotheses associated with a first group of nodes.

3. The apparatus of claim 2, wherein the instructions to calculate the one or more first channel capacities for each precoder hypothesis are further executable by the processor to cause the apparatus to:

calculate the one or more first channel capacities for a subset of precoder hypotheses associated with each node of the first group of nodes.

4. The apparatus of claim 2, wherein the instructions are further executable by the processor to cause the apparatus to:

determine that the first precoder hypothesis is associated with a first node of the first group of nodes; and select precoder hypotheses from one or more nodes for the first group of nodes to include in the second subset of precoder hypotheses based at least in part on proximity of the one or more nodes to the first node.

5. The apparatus of claim 4, wherein the one or more nodes are on a first side of the first node.

6. The apparatus of claim 1, wherein the instructions to select the one or more grouping co-phase factors are further executable by the processor to cause the apparatus to select the one or more grouping co-phase factors based at least in part on both the first precoder hypothesis and the second precoder hypothesis.

7. The apparatus of claim 1, wherein the instructions to select the one or more grouping co-phase factors are further executable by the processor to cause the apparatus to select the one or more grouping co-phase factors based at least in part on the first precoder hypothesis, wherein the instructions are further executable by the processor to cause the apparatus to:

select one or more second grouping co-phase factors based at least in part on the second precoder hypothesis; and transmit a second PMI report that indicates a second precoder index based at least in part on the selected one or more second grouping co-phase factors.

8. The apparatus of claim 7, wherein the second subset of precoder hypotheses are associated with a received signal that was transmitted using the first PMI report.

9. The apparatus of claim 1, wherein the instructions to determine the first precoder hypothesis are further executable by the processor to cause the apparatus to:

determine a precoder hypothesis with a highest channel capacity; and select the precoder hypothesis with the highest channel capacity as the first precoder hypothesis.

10. The apparatus of claim 1, wherein the instructions to select the one or more grouping co-phase factors are further executable by the processor to cause the apparatus to:

select one or more grouping co-phase factors for each channel rank.

11. The apparatus of claim 1, wherein the instructions are further executable by the processor to cause the apparatus to:

enter a short-term monitoring mode;

during the short-term monitoring mode, select one of a right-side rule or a left-side rule; and apply the selected right-side rule or the left-side rule for selecting at least one of the first subset of precoder hypotheses or the second subset of precoder hypotheses.

12. The apparatus of claim 11, wherein the instructions to select one of the right-side rule or the left-side rule during the short-term monitoring mode are further executable by the processor to cause the apparatus to:

determine the first subset of precoder hypotheses using a first rule of the right-side rule or the left-side rule, wherein the instructions to select the second subset of precoder hypotheses are further executable by the processor to cause the apparatus to select the second subset of precoder hypotheses based on a second rule of the right-side rule or the left-side rule, wherein the second rule is different than the first rule;

determine a quantization metric between the first subset of precoder hypotheses and the second subset of precoder hypotheses; and select the right-side rule or the left-side rule based at least in part on the quantization metric.

13. The apparatus of claim 12, wherein the instructions are further executable by the processor to cause the apparatus to:

enter a long-term operational mode using the selected right-side rule or left-side rule.

14. The apparatus of claim 11, wherein the instructions are further executable by the processor to cause the apparatus to:

construct the first subset of precoder hypotheses using the selected right-side rule or the left-side rule, wherein the instructions to select the second subset of precoder hypotheses are further executable by the processor to cause the apparatus to select the second subset of precoder hypotheses based on the selected right-side rule or the left-side rule.

15. The apparatus of claim 1, wherein the apparatus is a wireless communication terminal and further comprises an antenna and a transceiver.

16. A method for wireless communications, comprising:

calculating one or more first channel capacities for each precoder hypothesis of a first subset of precoder hypotheses;

selecting a first precoder hypothesis of the first subset of precoder hypotheses based at least in part on the calculated first channel capacities;

selecting a second subset of precoder hypotheses based at least in part on the first precoder hypothesis;

calculating one or more second channel capacities for each precoder hypothesis of the second subset of precoder hypotheses;

selecting a second precoder hypothesis of the second subset of precoder hypotheses based at least in part on the calculated second channel capacities;

selecting one or more grouping co-phase factors based at least in part on the first precoder hypothesis or the second precoder hypothesis; and transmitting a first precoding matrix indicator (PMI) report that indicates a first precoder index based at least in part on the one or more grouping co-phase factors.

17. The method of claim 16, wherein the first subset of precoder hypotheses further comprises two or more precoder hypotheses associated with a first group of nodes, wherein each of the two or more precoder hypotheses associated with each node has a same phase.

18. The method of claim 17, wherein calculating the one or more first channel capacities for each precoder hypothesis further comprises:
calculating the one or more first channel capacities for a subset of precoder hypotheses associated with each node of the first group of nodes.

19. The method of claim 17, further comprising:
determining that the first precoder hypothesis is associated with a first node of the first group of nodes; and
selecting precoder hypotheses from one or more nodes for the first group of nodes to include in the second subset of precoder hypotheses based at least in part on proximity of the one or more nodes to the first node.

20. The method of claim 19, wherein the one or more nodes are on a first side of the first node.

21. The method of claim 16, wherein selecting the one or more grouping co-phase factors is based at least in part on both the first precoder hypothesis and the second precoder hypothesis.

22. The method of claim 16, wherein selecting the one or more grouping co-phase factors is based at least in part on the first precoder hypothesis, the method further comprising:
selecting one or more second grouping co-phase factors based at least in part on the second precoder hypothesis; and
transmitting a second PMI report that indicates a second precoder index based at least in part on the selected one or more second grouping co-phase factors.

23. The method of claim 16, wherein determining the first precoder hypothesis further comprises:
determining a precoder hypothesis with a highest channel capacity; and
selecting the precoder hypothesis with the highest channel capacity as the first precoder hypothesis.

24. The method of claim 16, wherein selecting the one or more grouping co-phase factors further comprises:
selecting one or more grouping co-phase factors for each channel rank.

25. The method of claim 16, further comprising:
entering a short-term monitoring mode;
during the short-term monitoring mode, selecting one of a right-side rule or a left-side rule; and
applying the selected right-side rule or the left-side rule for selecting at least one of the first subset of precoder hypotheses or the second subset of precoder hypotheses.

26. The method of claim 25, wherein selecting one of the right-side rule or the left-side rule during the short-term monitoring mode further comprises:
determining the first subset of precoder hypotheses using a first rule of the right-side rule or the left-side rule, wherein selecting the second subset of precoder hypotheses is further based on a second rule of the right-side rule or the left-side rule, wherein the second rule is different than the first rule;

determining a quantization metric between the first subset of precoder hypotheses and the second subset of precoder hypotheses; and
selecting the right-side rule or the left-side rule based at least in part on the quantization metric.

27. The method of claim 26, further comprising:
entering a long-term operational mode using the selected right-side rule or left-side rule.

28. The method of claim 25, further comprising:
constructing the first subset of precoder hypotheses using the selected right-side rule or the left-side rule, wherein selecting the second subset of precoder hypotheses is further based on the selected right-side rule or the left-side rule.

29. An apparatus for wireless communications, comprising:
means for calculating one or more first channel capacities for each precoder hypothesis of a first subset of precoder hypotheses;
means for selecting a first precoder hypothesis of the first subset of precoder hypotheses based at least in part on the calculated first channel capacities;
means for selecting a second subset of precoder hypotheses based at least in part on the first precoder hypothesis;
means for calculating one or more second channel capacities for each precoder hypothesis of the second subset of precoder hypotheses;
means for selecting a second precoder hypothesis of the second subset of precoder hypotheses based at least in part on the calculated second channel capacities;
means for selecting one or more grouping co-phase factors based at least in part on the first precoder hypothesis or the second precoder hypothesis; and
means for transmitting a first precoding matrix indicator (PMI) report that indicates a first precoder index based at least in part on the one or more grouping co-phase factors.

30. A non-transitory computer-readable medium storing code for wireless communications, the code comprising instructions executable by a processor to:
calculate one or more first channel capacities for each precoder hypothesis of a first subset of precoder hypotheses;
select a first precoder hypothesis of the first subset of precoder hypotheses based at least in part on the calculated first channel capacities;
select a second subset of precoder hypotheses based at least in part on the first precoder hypothesis;
calculate one or more second channel capacities for each precoder hypothesis of the second subset of precoder hypotheses;
select a second precoder hypothesis of the second subset of precoder hypotheses based at least in part on the calculated second channel capacities;
select one or more grouping co-phase factors based at least in part on the first precoder hypothesis or the second precoder hypothesis; and
transmit a first precoding matrix indicator (PMI) report that indicates a first precoder index based at least in part on the one or more grouping co-phase factors.

* * * * *